US006795381B2

(12) United States Patent
Ando et al.

(10) Patent No.: US 6,795,381 B2
(45) Date of Patent: Sep. 21, 2004

(54) MULTI-BODY MULTI-PURPOSE INFORMATION PROCESSING APPARATUS

(75) Inventors: Hideo Ando, Hino (JP); Seigo Ito, Hanno (JP); Hiromichi Kobori, Yokohama (JP); Naobumi Seo, Yokohama (JP); Hiroaki Unno, Yokohama (JP); Hisashi Yamada, Yokohama (JP); Hiroharu Satoh, Tokyo (JP); Koji Maruyama, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/186,655

(22) Filed: Jul. 2, 2002

(65) Prior Publication Data

US 2002/0191499 A1 Dec. 19, 2002

Related U.S. Application Data

(63) Continuation of application No. 09/635,435, filed on Aug. 11, 2000, which is a continuation of application No. PCT/JP99/00620, filed on Feb. 12, 1999.

(30) Foreign Application Priority Data

Feb. 12, 1998 (JP) .......................................... 10-030245

(51) Int. Cl.[7] ............................................. G11B 7/085
(52) U.S. Cl. .................................................. 369/30.03
(58) Field of Search ........................ 345/169; 369/30.03

(56) References Cited

U.S. PATENT DOCUMENTS

| 5,265,083 A | 11/1993 | Ishii et al. ................. 369/75.2 |
| D377,648 S | 1/1997 | Young ........................ D14/136 |
| 5,719,799 A | * 2/1998 | Isashi ......................... 708/105 |
| D410,464 S | 6/1999 | Hakoda ..................... D14/136 |
| 6,046,754 A | * 4/2000 | Stanek ....................... 345/169 |

FOREIGN PATENT DOCUMENTS

| GB | 2305715 A | * 4/1997 | ........... G06K/11/16 |
| JP | 5-66855 | 3/1993 | |
| JP | 5-298257 | 11/1993 | |
| JP | 05298257 A | * 11/1993 | ........... G06F/15/02 |
| JP | 06161636 A | * 6/1994 | ............. G06F/3/03 |
| JP | 06208425 A | * 7/1994 | ............. G06F/1/16 |
| JP | 07160418 A | * 6/1995 | ........... G06F/3/033 |
| JP | 8-22343 | 1/1996 | |
| JP | 8-211978 | 8/1996 | |
| JP | 8-212561 | 8/1996 | |
| JP | 8-287655 | 11/1996 | |
| JP | 9-7308 | 1/1997 | |
| JP | 10-021673 | 1/1998 | |
| WO | WO 96/19807 | 6/1996 | |

* cited by examiner

Primary Examiner—David Davis
(74) Attorney, Agent, or Firm—Pillsbury Winthrop LLP

(57) ABSTRACT

According to this invention, general addresses are given to a multi-layer information storage medium to facilitate handling of information. That is, it is possible to set generalized addresses for multiple information layers, and information indicating a condition for setting the general addresses, e.g., the contents of a disk ID zone in a rewritable zone of a lead-in area, is recorded on an information reproducing layer.

15 Claims, 36 Drawing Sheets

| | | NAME | ROTATIONAL SPEED (Hz) | PHYSICAL SECTOR NUMBER |
|---|---|---|---|---|
| LEAD-IN | EMBOSS ZONE | REFERENCE SIGNAL ZONE | 37.57 | 27AB0~2FFFF |
| | | CONTROL DATA ZONE | | |
| | MIRROR ZONE | CONNECTION ZONE | | |
| | REWRITABLE ZONE | DISK TEST ZONE | 39.78 | 30000~30FFF |
| | | DRIVE TEST ZONE | | |
| | | DISK ID ZONE | | |
| | | DMA1&DMA2 | | |
| DATA AREA | | ZONE00 | 39.78 | 31000~37D5F |
| | | ZONE01 | 37.57 | 37D60~4021F |
| | | ZONE02 | 35.59 | 40220~48E3F |
| | | ZONE03 | 33.81 | 48E40~521BF |
| | | ZONE04 | 32.20 | 521C0~5BC9F |
| | | ZONE05 | 30.74 | 5BCA0~65EDF |
| | | ZONE06 | 29.40 | 65EE0~7087F |
| | | ZONE07 | 28.18 | 70880~7B97F |
| | | ZONE08 | 27.05 | 7B980~871DF |
| | | ZONE09 | 26.01 | 871E0~9319F |
| | | ZONE10 | 25.05 | 931A0~9F8BF |
| | | ZONE11 | 24.15 | 9F8C0~AC73F |
| | | ZONE12 | 23.32 | AC740~B9D1F |
| | | ZONE13 | 22.54 | B9D20~C7A5F |
| | | ZONE14 | 21.82 | C7A60~D5EFF |
| | | ZONE15 | 21.13 | D5F00~E4AFF |
| | | ZONE16 | 20.49 | E4B00~F3E5F |
| | | ZONE17 | 19.89 | F3E60~10391F |
| | | ZONE18 | 19.32 | 103920~113B3F |
| | | ZONE19 | 18.79 | 113B40~1244BF |
| | | ZONE20 | 18.28 | 1244C0~13559F |
| | | ZONE21 | 17.80 | 1355A0~146DDF |
| | | ZONE22 | 17.34 | 146DE0~158D7F |
| | | ZONE23 | 16.91 | 158D80~16B47F |
| LEAD-OUT | REWRITABLE ZONE | DMA3&DMA4 | 16.91 | 16B480~17966F |
| | | DISK ID ZONE | | |
| | | DRIVE TEST ZONE | | |
| | | DISK TEST ZONE | | |

FIG. 18

| ZONE NAME | CONTENTS OF EACH ZONE | |
|---|---|---|
| EMBOSS DATA ZONE | BLANK ZONE | |
| | REFERENCE SIGNAL ZONE | |
| | BLANK ZONE | |
| | CONTROL DATA ZONE | BOOK TYPE & PART VERSION ; DISK SIZE & MINIMUM READ RATE ; DISK STRUCTURE ; RECORDING DENSITY ; DATA AREA ALLOCATION ; BCA (BURST CUTTING AREA) DESCRIPTOR ; SPEED (LINEAR VELOCITY CONDITION FOR DESIGNATING THE AMOUNT OF EXPOSURE) ; READING POWER ; PEAK POWER ; BIAS POWER ; RESERVE ; INFORMATION ABOUT PRODUCTION OF MEDIUM ; RESERVE |
| | BLANK ZONE | |
| MIRROR ZONE | CONNECTION ZONE | |
| REWRITABLE DATA ZONE | GUARD TRACK ZONE | |
| | DISK TEST ZONE | |
| | DRIVE TEST ZONE | |
| | GUARD TRACK ZONE | |
| | DISK DESCRIPTOR (ID) ZONE | |
| | DMA1&DMA2 | |
| ⋮ | ZONE 00 TO ZONE 23 OF DATA AREA | |
| REWRITABLE ZONE | DMA3&DMA4 | |
| | DISK DESCRIPTOR (ID) ZONE | |
| | GUARD TRACK ZONE | |
| | DRIVE TEST ZONE | |
| | DISK TEST ZONE | |
| | GUARD TRACK ZONE | |

FIG. 19

| ZONE NUMBER | SECTOR NUMBER OF GUARD AREA | GROUP NUMBER | GROUP | | SECTOR NUMBER OF GUARD AREA | LOGICAL SECTOR NUMBER OF HEAD SECTOR IN EACH GROUP |
|---|---|---|---|---|---|---|
| | | | USER AREA SECTOR NUMBER (NUMBER OF SECTORS) | SPARE AREA SECTOR NUMBER | | |
| 00 | ...... | 00 | 31000~377DF (26592) | 377E0~37D2F | 37D30~37D5F | 0 |
| 01 | 37D60~37D8F | 01 | 37D90~3FB2F (32160) | 3FB30~401EF | 401F0~4021F | 26592 |
| 02 | 40220~4024F | 02 | 40250~486EF (33952) | 486F0~48E0F | 48E10~48E3F | 58752 |
| 03 | 48E40~48E6F | 03 | 48E70~51A0F (35774) | 51A10~5218F | 52190~521BF | 92704 |
| 04 | 521C0~521EF | 04 | 521F0~5B48F (37536) | 5B490~5BC6F | 5BC70~5BC9F | 128448 |
| ⋮ | ⋮ | ⋮ | ⋮ | ⋮ | ⋮ | ⋮ |
| 20 | 1244C0~12450F | 20 | 124510~13476F (66114) | 134770~13554F | 135550~13559F | 943552 |
| 21 | 1355A0~1355EF | 21 | 1355F0~145F4F (67936) | 145F50~146D8F | 146D90~146DDF | 1009696 |
| 22 | 146DE0~146E2F | 22 | 146E30~157E8F (69728) | 157E90~158D2F | 158D30~158D7F | 1077632 |
| 23 | 158D80~158DCF | 23 | 158DD0~16A57F (71600) | 16A580~16B47F | ...... | 1147360 |

FIG. 21

AREA STRUCTURE ON DVD-ROM DISK

| TOP PHYSICAL SECTOR NUMBER (Hex) | CONTENTS OF EACH DATA | INFORMATION STRUCTURE IN DATA |
|---|---|---|
|  | BLANK DATA | ALL 00h |
| 02F000 | REFERENCE CODE | "127" REPEATED |
| 02F020 | BLANK DATA | ALL 00h |
| 02F200 | CONTROL DATA | PHYSICAL FORMAT INFORMATION |
|  |  | DISK PRODUCTION INFORMATION |
|  |  | CONTENTS PROVIDER INFORMATION |
| 02FE00 | BLANK DATA | ALL 00h |
| 030000 | DATA AREA |  |

INSIDE DVD-ROM LEAD-IN AREA

| DETAILED INFORMATION CONTENTS | NUMBER OF USE BYTES |
|---|---|
| BOOK TYPE AND PART VERSION | 1BYTE |
| DISK SIZE AND MINIMUM READOUT RATE | 1BYTE |
| DISK STRUCTURE | 1BYTE |
| RECORDING DENSITY | 1BYTE |
| DATA AREA ALLOCATION | 12BYTES |
| BCA DESCRIPTOR | 1BYTE |
| RESERVE | 15BYTES |
| RESERVE | 2016BYTES |

DETAILED INFORMATION CONTENTS OF PHYSICAL FORMAT INFORMATION

FIG. 26

DIRECTORY STRUCTURE OF INFORMATION
RECORDED ON INFORMATION STORAGE MEDIUM

DIRECTORY STRUCTURE OF INFORMATION STORAGE MEDIUM
FOR VIDEO INFORMATION PROCESSING

| LSN | LBN | STRUCTURE 411 | DESCRIPTOR 442 | CONTENTS 443 |
|---|---|---|---|---|
| 0~15 | | | RESERVE 459 (ALL 00h BYTES) | |
| 16 | | VOLUME RECOGNITION SEQUENCE 444 | BEGINNING EXTENDED AREA DESCRIPTOR 445 | VRS START POSITION |
| 17 | | | VOLUME STRUCTURE DESCRIPTOR 446 | EXPLANATION OF DISK CONTENTS |
| 18 | | | BOOT DESCRIPTOR 447 | BOOT START POSITION |
| 19 | | | TERMINATING EXTENDED AREA DESCRIPTOR 448 | VRS END POSITION |
| ~31 | | | RESERVE 460 (ALL 00h BYTES) | |
| 32~ | | | OMITTED | |
| 34 | | MAIN VOLUME DESCRIPTOR SEQUENCE 449 | PARTITION DESCRIPTOR 450 PARTITION CONTENTS USE 451 SPACE TABLE 452 WHICH IS NOT ALLOCATED AD (80) SPACE BIT MAP 453 WHICH IS NOT ALLOCATED AD (0) | RECORDING POSITION OF SPACE TABLE RECORDING POSITION OF SPACE BIT MAP |
| 35 | | | LOGICAL VOLUME DESCRIPTOR 454 LOGICAL VOLUME CONTENTS USE 455 LAD (100) | RECORDING POSITION OF FILE SET DESCRIPTOR 472 |
| ~47 | | | OMITTED | |
| ~63 | | | OMITTED | |
| ~255 | | | RESERVE 461 (ALL 00h BYTES) | |
| 256 | | FIRST ANCHOR POINT 456 | ANCHOR VOLUME DESCRIPTOR POINTER 458 | |
| ~271 | | | RESERVE 462 (ALL 00h BYTES) | |

FIG. 29

| | | | | |
|---|---|---|---|---|
| 272~321 | 0~49 | | SPACE BIT MAP DESCRIPTOR 470 | MAPPING OF RECORDING/ UNRECORDING OF SPACE BIT MAP |
| 322~371 | 50~99 | | USE(AD(*),AD(*),···, AD(*)) 471 | LIST OF EXTENTS OF UNRECORDED STATE OF SPACE TABLE |
| 372 | 100 | FILE STRUCTURE 486 | FILE SET DESCRIPTOR 472; ROOT DIRECTORY ICB473; LAD(102) 474 | RECORDING POSITION OF ROOT DIRECTORY FE |
| 373 | 101 | | OMITTED | |
| 374 | 102 | | ROOT DIRECTORY AFE(AD(103)) 475 | RECORDING POSITION OF FIDs |
| 375 | 103 | | A'S FID(LAD(104),LAD(110)) 476 | FE POSITION OF B,D |
| 376 | 104 | | PARENT DIRECTORY EFE(AD(105)) 477 | RECORDING POSITION OF FIDs |
| 377 | 105 | | B'S FID(LAD(106)) 478 | FE POSITION OF C |
| 378 | 106 | | FE(AD(107)AD(108)AD(109)) 479 | FILE DATA POSITION |
| 382 | 110 | | FE OF DIRECTORY D(AD(111)) 480 | RECORDING POSITION OF FIDs |
| 383 | 111 | | D'S FID(LAD(112),LAD(NONE)) 481 | FE POSITION OF E,F |
| 384 | 112 | | FE OF SUB DIRECTORY F(AD(113)) 482 | RECORDING POSITION OF FIDs |
| 385 | 113 | | FID(LAD(NONE), LAD(114),LAD(118)) 483 | FE POSITION OF H, I |
| 386 | 114 | | FE(AD(115)AD(116)AD(117)) 484 | FILE DATA POSITION |
| 390 | 118 | | I'S FE(AD(119),AD(120)) 485 | FILE DATA POSITION |
| 379~ | 107~ | FILE DATA 487 | INFORMATION OF FILE DATA C 488 | |
| 387~ | 115~ | | INFORMATION OF FILE DATA H 489 | |
| 391~ | 119~ | | INFORMATION OF FILE DATA I 490 | |

FIG. 30

| | | | |
|---|---|---|---|
| LLSN-271 ~ LLSN-257 | | RESERVE 463 (ALL 00h BYTES) | |
| LLSN-256 | SECOND ANCHOR POINT 457 | ANCHOR VOLUME DESCRIPTOR POINTER 458 | |
| LLSN-255 ~ LLSN-224 | | RESERVE 464 (ALL 00h BYTES) | |
| LLSN-223 ~ LLSN-208 | RESERVE VOLUME DESCRIPTOR SEQUENCE 467 | PARTITION DESCRIPTOR 450<br>PARTITION CONTENTS USE 451<br>SPACE TABLE 452 WHICH IS NOT ALLOCATED<br>SPACE BIT MAP 453 WHICH IS NOT ALLOCATED<br>LOGICAL VOLUME DESCRIPTOR 454<br>LOGICAL VOLUME CONTENTS USE 455 | BACKUP OF MAIN VOLUME DESCRIPTOR SEQUENCE |
| LLSN-207 ~ LLSN | | RESERVE 465 (ALL 00h BYTES) | |

NOTE 1> LSN = LOGICAL SECTOR NUMBER 491
LBN = LOGICAL BLOCK NUMBER 492
LLSN = LAST LOGICAL SECTOR NUMBER 493

FIG. 31

| INFORMATION RECORDING LOCATION | PRE-INITIALIZATION STATE | POST-INITIALIZATION STATE | NOTE |
|---|---|---|---|
| DISK ID ZONE 622 OF REWRITABLE ZONE 613 OF DVDRAM LAYER | DESCRIBE LAMINATION STRUCTURE OF RAM LAYER/ROM LAYER AND TOTAL RECORDING CAPACITY + DESCRIBE PRE-INITIALIZATION STATE | DESCRIBE LAMINATION STRUCTURE OF RAM LAYER/ROM LAYER AND TOTAL RECORDING CAPACITY + DESCRIBE DATE OF INITIALIZATION | DESCRIBE REWRITABLE DISK IN BOOK TYPE AND PART VERSION IN CONTROL DATA ZONE IN LEAD-IN AREA |
| "RESERVE" AREA IN PHYSICAL FORMAT INFORMATION IN CONTROL DATA IN LEAD-IN AREA OF DVDROM LAYER | | DISPLAY RANGE OF COPYING FROM DVDROM LAYER TO DVDRAM LAYER AT THE TIME OF INITIALIZATION IN PHYSICAL SECTOR OF DVDROM LAYER | DESCRIBE READ-ONLY DISK IN BOOK TYPE AND PART VERSION IN PHYSICAL FORMAT INFORMATION IN CONTROL DATA ZONE IN LEAD-IN AREA |
| VOLUME RECOGNITION SEQUENCE | RECORDED IN DVDROM LAYER BEFOREHAND → THIS RECORDING POSITION DIFFERS FROM RECORDING POSITION AT THE TIME OF USAGE | COPY THIS INFORMATION IN DVDRAM LAYER → START POSITION OF LOGICAL SECTOR NUMBER OF COPY DESTINATION IS "16" | BOOT DESCRIPTOR 447 IN VOLUME RECOGNITION SEQUENCE 44 INDICATES EXECUTION APPLICATION OF ROM LAYER |

FIG. 36A

| INFORMATION RECORDING LOCATION | PRE-INITIALIZATION STATE | POST-INITIALIZATION STATE | NOTE |
|---|---|---|---|
| FIRST ANCHOR POINT | RECORDED IN DVDROM LAYER BEFOREHAND → DESIGNATION DESTINATION IS DESIGNATED BY LOGICAL SECTOR NUMBER LSN OF RAM LAYER AFTER COPYING | COPY THIS INFORMATION IN DVDRAM LAYER → LOGICAL SECTOR NUMBER LSN OF COPY DESTINATION IS "256" | AFTER INITIALIZATION, USE INFORMATION COPIED IN DVDRAM LAYER |
| MAIN VOLUME DESCRIPTOR SEQUENCE | RECORDED IN DVDROM LAYER BEFOREHAND → DESIGNATION DESTINATION IS DESIGNATED BY LOGICAL SECTOR NUMBER OF RAM LAYER AFTER COPYING | COPY THIS INFORMATION IN DVDRAM LAYER → LSN OF COPY DESTINATION COINCIDES WITH ACTUAL LSN | AFTER INITIALIZATION, USE INFORMATION COPIED IN DVDRAM LAYER |
| LOGICAL VOLUME INTEGRITY SEQUENCE | RECORDED IN DVDROM LAYER BEFOREHAND | COPY INFORMATION IN DVDRAM LAYER | USE INFORMATION COPIED IN DVDRAM LAYER |
| SPACE BIT MAP OR SPACE TABLE | RECORDED IN DVDROM LAYER BEFOREHAND | COPY THIS INFORMATION IN DVDRAM LAYER → USE COPIED INFORMATION | SET ALL LOGICAL BLOCK NUMBERS LBN CORRESPONDING TO DVDROM LAYER AS USED |

FIG. 36B

| INFORMATION RECORDING LOCATION | PRE-INITIALIZATION STATE | POST-INITIALIZATION STATE | NOTE |
|---|---|---|---|
| FILE SET DESCRIPTOR | RECORDED IN DVDROM LAYER BEFOREHAND | COPY THIS INFORMATION IN DVDRAM LAYER → USE COPIED INFORMATION | DESIGNATION LOGICAL BLOCK NUMBER LBN HERE DESIGNATES RAM LAYER |
| FILE ENTRY OF ROOT DIRECTORY | RECORDED IN DVDROM LAYER BEFOREHAND | COPY THIS INFORMATION IN DVDRAM LAYER → USE COPIED INFORMATION | DESIGNATION LBN HERE DESIGNATES RAM LAYER |
| LADs IN ROOT DIRECTORY | RECORDED IN DVDROM LAYER BEFOREHAND, INCLUDING APPLICATION DIRECTORY | COPY INFORMATION IN DVDRAM LAYER → USER ADD USING COPIED INFORMATION | FILE ENTRY DESIGNATION LBN DESIGNATES RAM LAYER, INCLUDING APPLICATION DIRECTORY, BEFORE COPYING |
| APPLICATION EXECUTION FILE INFORMATION | RECORDED IN DVDROM LAYER BEFOREHAND | NOT COPIED | THIS RECORDING POSITION DESIGNATION LBN DESIGNATES ROM LAYER |

FIG. 37A

| INFORMATION RECORDING LOCATION | PRE-INITIALIZATION STATE | POST-INITIALIZATION STATE | NOTE |
|---|---|---|---|
| APPLICATION TEMPLATE DIRECTORY | RECORDED IN DVDROM LAYER BEFOREHAND | NOT COPIED | THIS RECORDING POSITION DESIGNATION LBN DESIGNATES ROM LAYER |
| APPLICATION DATA FILE | NOT RECORDED | NEWLY CREATE ON DVDRAM LAYER | CREATE WHEN APLICATION IS INVOKED |
| APPLICATION RELATIVE DIRECTORY | RECORDED IN DVDROM LAYER BEFOREHAND | COPY INFORMATION IN DVDRAM LAYER → USE COPIED INFORMATION | DESIGNATION LBN HERE DESIGNATES RAM LAYER |
| SECOND ANCHOR POINT | RECORDED IN DVDROM LAYER BEFOREHAND | NOT COPIED | THIS DESIGNATION LBN DESIGNATES RAM LAYER |
| RESERVE VOLUME DESCRIPTOR SEQUENCE | RECORDED IN DVDROM LAYER BEFOREHAND | NOT COPIED | THIS DESIGNATION LBN DESIGNATES RAM LAYER |

FIG. 37B

| INFORMATION RECORDING LOCATION | PRE-INITIALIZATION STATE | POST-INITIALIZATION STATE | NOTE |
|---|---|---|---|
| DISK ID ZONE 622 OF REWRITABLE ZONE 613 OF DVDRAM LAYER | DESCRIBE LAMINATION STRUCTURE OF RAM LAYER/ROM LAYER + DESCRIBE PRE-INITIALIZATION STATE | DESCRIBE LAMINATION STRUCTURE OF RAM LAYER/ROM LAYER + DESCRIBE DATE OF INITIALIZATION | DESCRIBE REWRITABLE DISK IN BOOK TYPE AND PART VERSION IN CONTROL DATA ZONE IN LEAD-IN AREA |
| "RESERVE" AREA IN PHYSICAL FORMAT INFORMATION IN CONTROL DATA IN LEAD-IN AREA OF DVDROM LAYER | DISPLAY RANGE OF COPYING FROM DVDROM LAYER TO DVDRAM LAYER AT THE TIME OF INITIALIZATION IN PHYSICAL SECTOR OF DVDROM LAYER | | DESCRIBE READ-ONLY DISK IN BOOK TYPE AND PART VERSION IN PHYSICAL FORMAT INFORMATION IN CONTROL DATA ZONE IN LEAD-IN AREA |
| VOLUME RECOGNITION SEQUENCE | RECORDED IN DVDROM LAYER BEFOREHAND | NOT COPIED | THIS RECORDING POSITION DESIGNATION LBN DESIGNATES ROM LAYER |

FIG. 38A

| INFORMATION RECORDING LOCATION | PRE-INITIALIZATION STATE | POST-INITIALIZATION STATE | NOTE |
|---|---|---|---|
| FIRST ANCHOR POINT | RECORDED IN DVDROM LAYER BEFOREHAND | NOT COPIED | THIS RECORDING POSITION DESIGNATION LBN DESIGNATES ROM LAYER |
| MAIN VOLUME DESCRIPTOR SEQUENCE | RECORDED IN DVDROM LAYER BEFOREHAND | NOT COPIED | THIS RECORDING POSITION DESIGNATION LBN DESIGNATES ROM LAYER |
| LOGICAL VOLUME INTEGRITY SEQUENCE | RECORDED IN DVDROM LAYER BEFOREHAND | NOT COPIED | THIS RECORDING POSITION DESIGNATION LBN DESIGNATES ROM LAYER |
| SPACE BIT MAP OR SPACE TABLE | RECORDED IN DVDROM LAYER BEFOREHAND | COPY THIS INFORMATION IN DVDRAM LAYER → USE COPIED INFORMATION | SET ALL LOGICAL BLOCK NUMBERS LBN CORRESPONDING TO DVDROM LAYER AS USED |

FIG. 38B

| INFORMATION RECORDING LOCATION | PRE-INITIALIZATION STATE | POST-INITIALIZATION STATE | NOTE |
|---|---|---|---|
| FILE SET DESCRIPTOR | RECORDED IN DVDROM LAYER BEFOREHAND | COPY THIS INFORMATION IN DVDRAM LAYER → USE COPIED INFORMATION | DESIGNATION LOGICAL BLOCK NUMBER LBN HERE DESIGNATES RAM LAYER |
| FILE ENTRY OF ROOT DIRECTORY | RECORDED IN DVDROM LAYER BEFOREHAND | COPY THIS INFORMATION IN DVDRAM LAYER → USE COPIED INFORMATION | DESIGNATION LBN HERE DESIGNATES RAM LAYER |
| LADs IN ROOT DIRECTORY | RECORDED IN DVDROM LAYER BEFOREHAND, INCLUDING APPLICATION DIRECTORY | COPY INFORMATION IN DVDRAM LAYER → USER ADD USING COPIED INFORMATION | FILE ENTRY DESIGNATION LBN DESIGNATES RAM LAYER, INCLUDING APPLICATION DIRECTORY, BEFORE COPYING |
| APPLICATION EXECUTION FILE INFORMATION | RECORDED IN DVDROM LAYER BEFOREHAND | NOT COPIED | THIS RECORDING POSITION DESIGNATION LBN DESIGNATES ROM LAYER |

FIG. 39A

| INFORMATION RECORDING LOCATION | PRE-INITIALIZATION STATE | POST-INITIALIZATION STATE | NOTE |
|---|---|---|---|
| APPLICATION TEMPLATE DIRECTORY | RECORDED IN DVDROM LAYER BEFOREHAND | NOT COPIED | THIS RECORDING POSITION DESIGNATION LBN DESIGNATES ROM LAYER |
| APPLICATION DATA FILE | NOT RECORDED | NEWLY CREATE ON DVDRAM LAYER | CREATE WHEN APLICATION IS INVOKED |
| APPLICATION RELATIVE DIRECTORY | RECORDED IN DVDROM LAYER BEFOREHAND | COPY INFORMATION IN DVDRAM LAYER → USE COPIED INFORMATION | DESIGNATION LBN HERE DESIGNATES RAM LAYER |
| SECOND ANCHOR POINT | RECORDED IN DVDROM LAYER BEFOREHAND → DESIGNATION IS DESIGNATED BY LOGICAL SECTOR NUMBER LSN OF RAM LAYER AFTER COPYING | COPY THIS INFORMATION IN DVDRAM LAYER → LSN OF COPY DESTINATION IS "LAST LSN-256" | AFTER INITIALIZATION, USE INFORMATION COPIED IN DVDRAM LAYER |
| RESERVE VOLUME DESCRIPTOR SEQUENCE | RECORDED IN DVDROM LAYER BEFOREHAND → DESIGNATION IS DESIGNATED BY LOGICAL SECTOR NUMBER LSN OF RAM LAYER AFTER COPYING | COPY THIS INFORMATION IN DVDRAM LAYER → LSN OF COPY DESTINATION COINCIDES WITH ACTUAL LSN | AFTER INITIALIZATION, USE INFORMATION COPIED IN DVDRAM LAYER |

FIG. 39B (INSAIDE MULTIPLE DISK PACK AS ONE VOLUME)

MULTI-BODY MULTI-PURPOSE INFORMATION PROCESSING APPARATUS

CROSS-REFERENCE TO RELATED APPLICATIONS

This is a Continuation of U.S. Ser. No. 09/635,435 filed Aug. 11, 2000, which is a Continuation of Application PCT/JP99/00620, filed Feb. 12, 1999.

This application is based upon and claims the benefit of priority from the prior Japanese Patent Application No. 10-030245, filed Feb. 12, 1998, the entire contents of which are incorporated herein by reference.

BACKGROUND OF THE INVENTION

The present invention relates to an information storage medium having multiple information layers and a multi-purpose information processing apparatus, which are effective in use in a recording/reproducing apparatus for DVD (Digital Video Disk), a transmitting/receiving apparatus and so forth.

As well known, recently, due to the advancement of the digital signal compression technology, a technology of digitizing video information has advanced in the MPEG (Moving Picture Image Coding Experts Group) or the like to allow video information to be handled in a PC (Personal Computer) environment and multimedia environments have been improved.

At present, however, the affinity between the PC environment and video information is very poor for the following two reasons:

1. Difference in the amounts of information to be processed . . . the problem of FAT (File Allocation Table) 16 and hindrance of the PC environment by video information processing.
2. Difference in the adequate information processing schemes necessity to secure continuous recording and reproduction.

That is,

1. Difference in the Amounts of Information to be Processed

At present, PCs often use FAT 16 as a file system for HDD (Hard Disk Drive) in view of compatibility with old PC data. FAT 16 permits a maximum of 2 GB (Giga bytes) per partition. When the data transfer rate of MPEG 2 is 5 Mbps (Mega bits per second), for example, only 53 minutes at a maximum can be recorded per partition. In recording two and half hours of a movie in an HDD of FAT 16, therefore, it is necessary to make recording over three partitions, making it difficult for a general-purpose PC system which does not use RAID (Redundant Arrays of Inexpensive Disk) to do automatic recording.

In the case of recording and editing video images, all of "recording/editing application software", "standard template information for edition and processing" and "video information to be recorded or edited" should be recorded within a PC environment, thus significantly suppressing the memory space of the PC environment. After a work of recording or editing video information is completed, the remaining memory space becomes small so that execution of another application software may be hindered.

2. Difference in the Adequate Information Processing Schemes

It is essential to secure a continuous operation for recording and reproducing video information. But, the seek time of the optical head of an information recording/reproducing apparatus is very long. When video information which is located here and there on an information storage medium is sought one piece after another and sequentially reproduced by the optical head, there is a case where a reproduced image is stopped during the seek time.

When conventional PC information and video information are recorded together on the same information storage medium, video information is very likely to be recorded dispersively on the information storage medium.

When a file is changed in a PC environment, the entire file data after the change is recorded again in an empty area on a information storage medium. The re-recording position on the information storage medium at this time is determined regardless of the recording position of file data before the change.

Because the amount of video information is vast as mentioned above, when a file is changed by the same method, re-recording takes considerable time. In the case of video information, therefore, it is desirable to re-record only a to-be-changed portion at the position before the change took place, without changing the position of an unchanged portion on the information storage medium. As this environment is not provided, however, it is very hard to handle video information in the PC environment.

The present invention has been made in view of the above situations, and it is a primary object to provide an information storage medium which has multiple layers and gives general addresses to this multiple information layers to thereby facilitate information handling, and a signal processing apparatus for that medium.

It is another object of this invention to provide a video information processing method effective in a PC environment, which prevents a PC environment from being hindered by the use of video information and can edit and process video information in a short period of time while securing a continuous operation at the time of recording or reproducing video information.

It is a further object of this invention to provide an optical system for the above video information processing.

BRIEF SUMMARY OF THE INVENTION

To achieve the above objects, this invention records, on an information storage medium having multiple information layers including a recording layer capable of making recording with condensed light, general addresses for the multiple information layers and information indicating a condition for setting the general addresses.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 18 is a diagram for explaining a general data format when this information storage medium is a DVD-RAM disk;

FIG. 19 is a diagram for explaining the detailed data formats of a lead-in area and lead-out area of this DVD-RAM disk;

FIG. 21 is a diagram for explaining the detailed data formats of the data area of this DVD-RAM disk;

FIG. 26 is a diagram for explaining the contents of information for describing the physical format of this DVD-ROM disk;

FIGS. 29, 30 and 31 are diagrams showing one example in which a file system is recorded on this information storage medium according to the UDF;

FIGS. 36A and 36B are diagrams for explaining information contents of the information storage medium shown in FIG. 33 before and after initialization in comparison with each other;

FIGS. 37A and 37B are diagrams for explaining information contents of the information storage medium shown in FIG. 33 before and after initialization in comparison with each other;

FIGS. 38A and 38B are diagrams for explaining information contents of the information storage medium shown in FIGS. 34A and 34B before and after initialization in comparison with each other;

FIGS. 39A and 39B are diagrams for explaining information contents of the information storage medium shown in FIGS. 34A and 34B before and after initialization in comparison with each other;

DETAILED DESCRIPTION OF THE INVENTION

Figure 1:
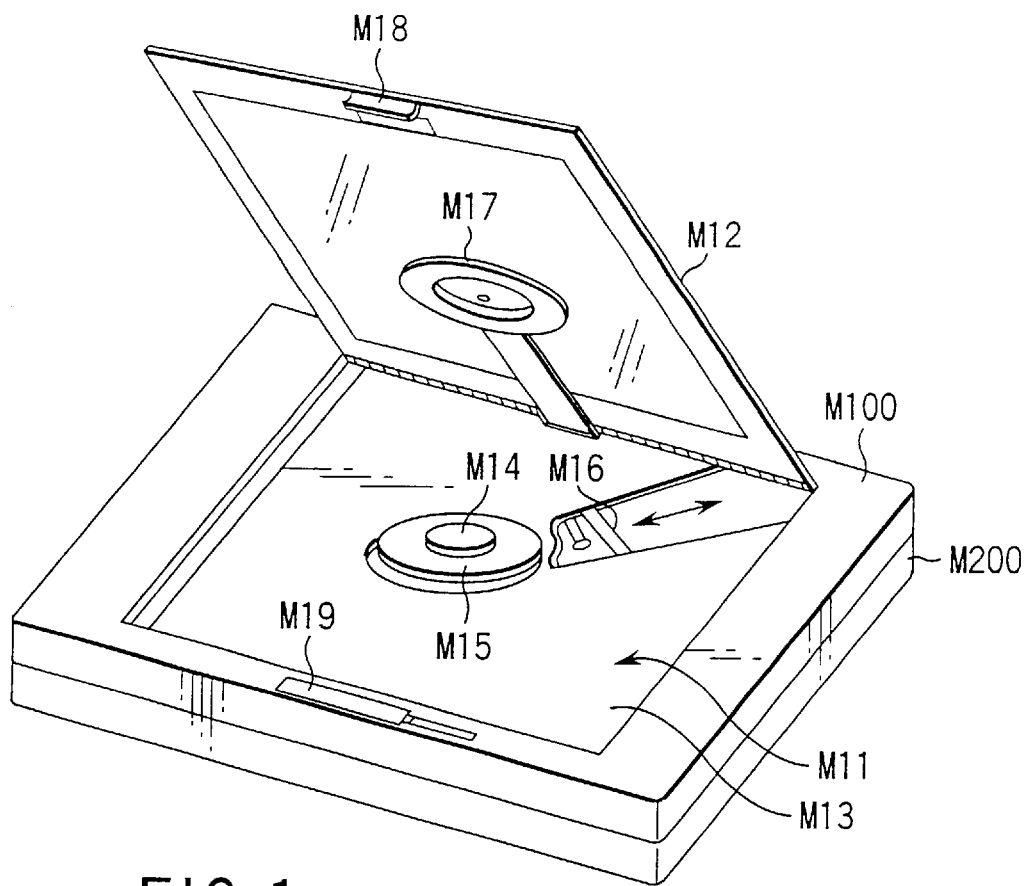
FIG. 1 is a perspective view of one embodiment of a multi-purpose information processing apparatus according to this invention, showing an opening/closing mechanism portion (lid) open.

To begin with, the concepts of the basic objects of this invention will be described hierarchically.

[1] To prevent a PC environment from being hindered by video information processing,

[1-1] All of "recording/editing application software", "standard template information for edition and processing" and "video information to be recorded or edited" are recorded on a removable information storage medium and the environment returns to the one before processing video information when this information storage medium is unloaded.

[1-2] "Recording/editing application software" and "standard template information for edition and processing" are designed into an emboss structure which is easily duplicatable, thereby reducing the cost of the medium.

[2] To secure a large capacity,

[2-1] Multiple information storage media, such as a disk pack, are provided with a method of setting serial logical sector numbers so that all can be handled as one volume.

[2-2] Even in a structure wherein a recording layer and information reproducing layer are placed on a single information storage medium, those two layers can be handled as one volume.

[3] To shorten the time for a process of partially modifying video information and facilitate edition in a PC environment,

[3-1] Video information is collected into one file (AV File) and a video information object and its management information are recorded in the same file.

[3-2] A recordable and reproducible video information directory (Videoram) is set, all the AV files (File) are arranged under that directory and an edition directory (Avi) in a PC is set in parallel.

[3-3] At the time of changing a file of video information, only a portion to be changed on the information storage medium is changed. That is, change and additional writing are carried out cell by cell with respect to a video object in one file.

[4] To ensure portability of a PC capable of processing video information,

[4-1] A structure which has only an IC (Integrated Circuit) memory including a removable memory card and an optical information recording/reproducing apparatus, i.e., a structure which does not have a HDD is provided, and the ROM section of a double layer disk having a RAM (Random Access Memory)/ROM (Read Only Memory) is provided with application software and a template, thereby securing memory space of a portable PC.

[4-2] The structure has a lid attached to the outside of a notebook type PC in a storage mode (in a folded state) for loading and unloading an information storage medium. This can allow the information storage medium to be unloaded when the notebook type PC is stored and can design the notebook type PC flatter.

Next, the basic conditions of this invention will be systematically and schematically discussed. First, the important features of this invention are grouped into two.

(A) Address setting method suitable for video information (B) Structure of a portable PC The address setting method suitable for video information in (A) is classified into:

(a1) a logical sector number setting scheme which generalizes a multi-layer disk including a recording layer, and (a2) a scheme of setting logical sector numbers in order from an outward zone of he disk.

The above items will be further classified as follows.

The logical sector number setting scheme which generalizes a multi-layer disk including a recording layer in (a1) includes:

(a11) a technique of providing each disk with information indicating the order of giving logical sector numbers, and (a12) a technique for a general logical sector number setting scheme for a double-layer disk of a recording layer/information reproducing layer.

The technique of providing each disk with information indicating the order of giving logical sector numbers in (a11) further includes:

(a111) a general logical sector number setting scheme for a multiple information storage medium, which includes:

(a1111) a technique of providing information for giving a general logical sector number, i.e., a technique of providing the number of disks in a disk pack, disk numbers and so forth.

The technique for a general logical sector number setting scheme for a double-layer disk of a recording layer/information reproducing layer in (a12) includes:

(a121) a technique of discriminating a file in the RAM section and a file in the ROM section based on permissions of a file entry, (a122) a technique of providing management information for unrecorded areas, considering the entire information reproducing layer as a recorded state and removing addresses corresponding to the information reproducing layer from the unrecorded area management information, (a123) a technique of using template information of the information reproducing layer, and (a124) a technique of performing automatic information copying from the information reproducing layer.

The technique of using template information of the information reproducing layer in (a123) includes:

(a1231) a technique of making a template as video window allocation information (album-like), and (a1232) a technique of making a template as a sub video containing a peripheral frame pattern (idol picture).

The technique of performing automatic information copying from the information reproducing layer in (a124) includes:

(a1241) a technique of recording essential information for performing automatic information copying, (a1242) a technique of automatically copying a recording and reproducing directory (Videoram) and a directory (Avi) for saving a conversion file for PC edition, and (a1243) a technique of automatically inserting CM (Commercial) information in a recorded video image in a sub video format.

The technique of recording essential information for performing automatic information copying in (a1241) includes:

(a12411) a technique in which a copy range is recorded at a reserve position of the lead-in area of the ROM section, and (a12412) a technique of providing a reserve position of the lead-in area of the RAM section with information indicating whether or not copying for a double-layer disk has been completed.

The technique in which a copy range is recorded at a reserve position of the lead-in area of the ROM section in (a12411) includes:

(a124111) copying the contents of the root directory, videoram directory and an audio video directory (Avi Directory) in the RAM section, and (a124112) allowing a user to designate the AV file size when the information storage medium which has been copied into the RAM section for the first time is used.

The technique of automatically inserting CM (Commercial) information in a recorded video image in a sub video format in (a1243) includes:

(a12431) a technique of recording the number of displays for each insertion of CM in a CM management area and stopping displaying CM when it is displayed a specific number of times (effect).

As a technique for the structure of a portable PC in (B), there is (b1) a technique of designing a structure which allows a disk to be loaded in the outside of a notebook type PC (mainly for a reproduction purpose only), and this technique includes:

(b11) a technique of fitting an optical disk drive on the display side, and (b12) a technique of fitting an optical disk drive on the keyboard side.

One embodiment of a system and an apparatus according to this invention will now be explained with reference to the drawings.

FIG. 1 illustrates the schematic structure of a multi-purpose information processing apparatus which will be discussed in this embodiment.

This multi-purpose information processing apparatus is of such a size as to be put in one hand, and incorporates a semiconductor MPU (Micro Processing Unit) as an information processing section in near the center portion in the casing though not illustrated. As shown in FIG. 1, with an opening/closing mechanism portion (lid) M12 open, an information storage medium (optical disk) can be loaded or unloaded. An information recording/reproducing section is located under the loaded information storage medium. After the loading of the information storage medium, the opening/closing mechanism portion M12 is closed (see FIG. 2), and then processing according to the type of the information storage medium is performed.

This multi-purpose information processing apparatus is provided with a speaker and an earphone jack terminal, so that when an audio CD (Compact Disk) is inserted as an information storage medium, one can listen to music as in the case of a CD Walkman stereo handset. Further, when the information storage medium of this invention is inserted, multi-purpose functions can be accomplished by a program which is recorded there.

A significant feature of this invention lies in that by switching an information storage medium where a program is recorded, as in the case of listening to different kinds of musics by switching a CD at home, different types of information processing become possible and, like a CD Walkman stereo handset, it has such an advantage as being small and excellent in portability.

Figure 3:
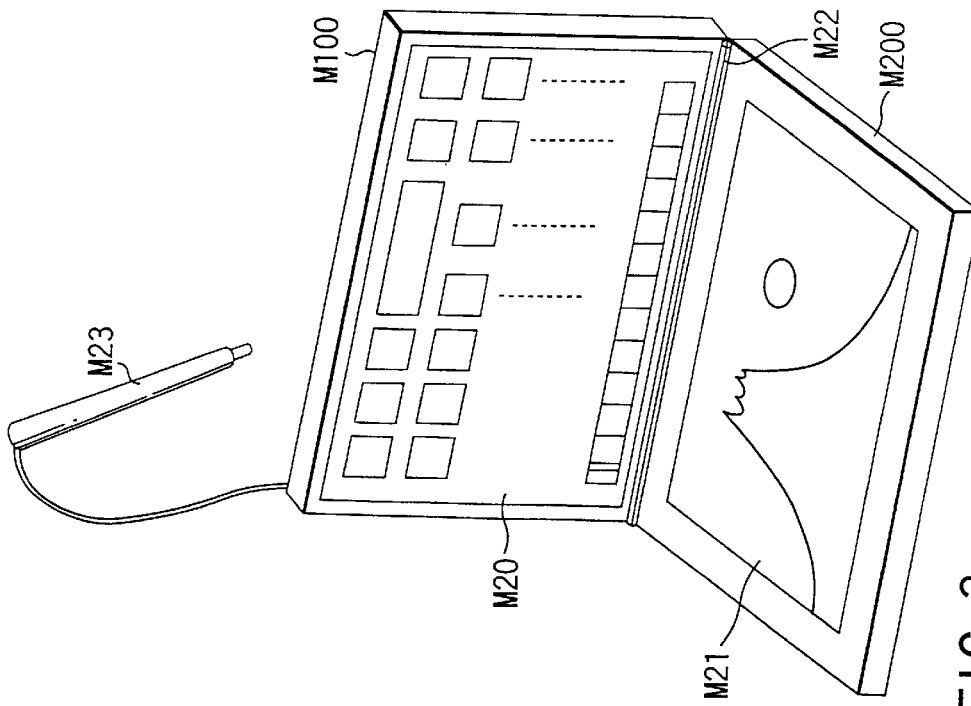
FIG. 3 is a perspective view illustrating one use mode of this multi-purpose information processing.

When a computer program, such as MS-Word or Excel, is recorded in an information storage medium, for example, it can be opened from the middle as shown in FIG. 3 and can be used as a notebook PC. That is, as shown in FIG. 3, arranged inside are an information display section M21, such as a liquid crystal display or plasma display, and an information input section M20, such as a keyboard, flat panel and a touch panel.

Figure 4:
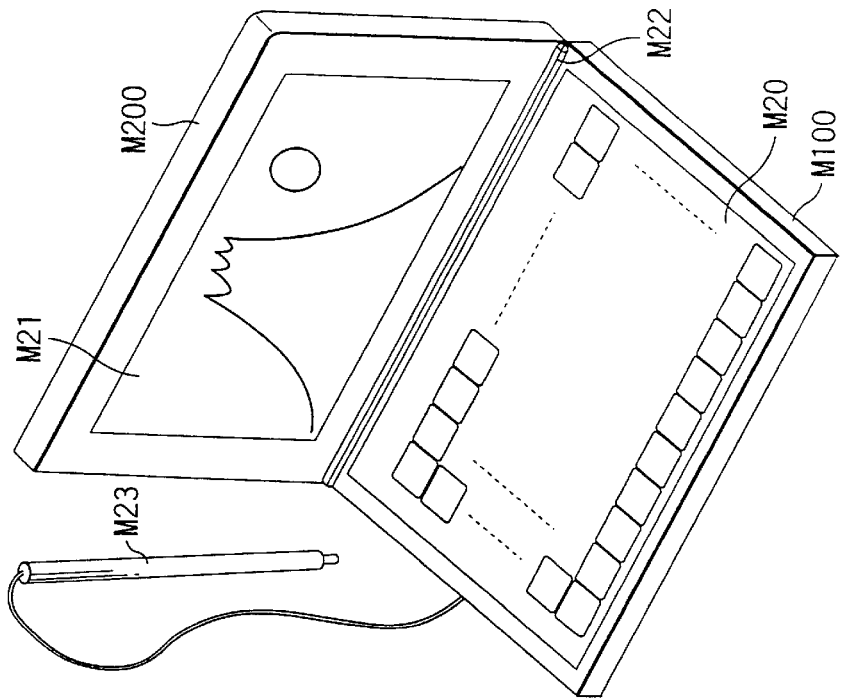
FIG. 4 is a perspective view illustrating another use mode of this multi-purpose information processing apparatus.
Figure 5:
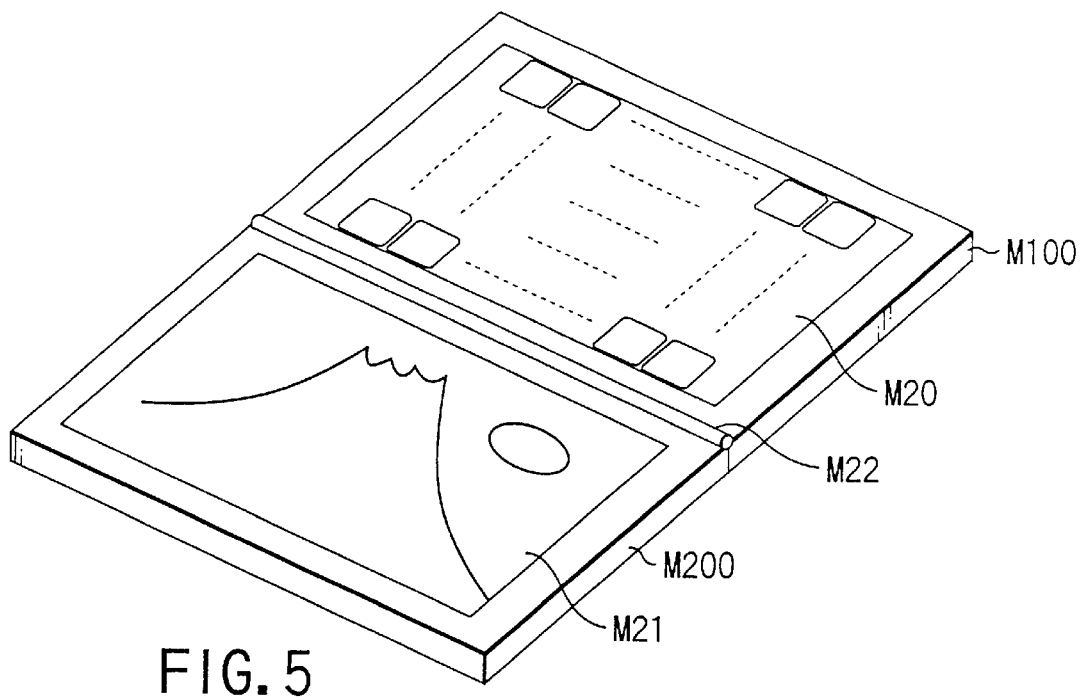
FIG. 5 is a perspective view showing a different use mode of this multi-purpose information processing apparatus.
Figure 6A:
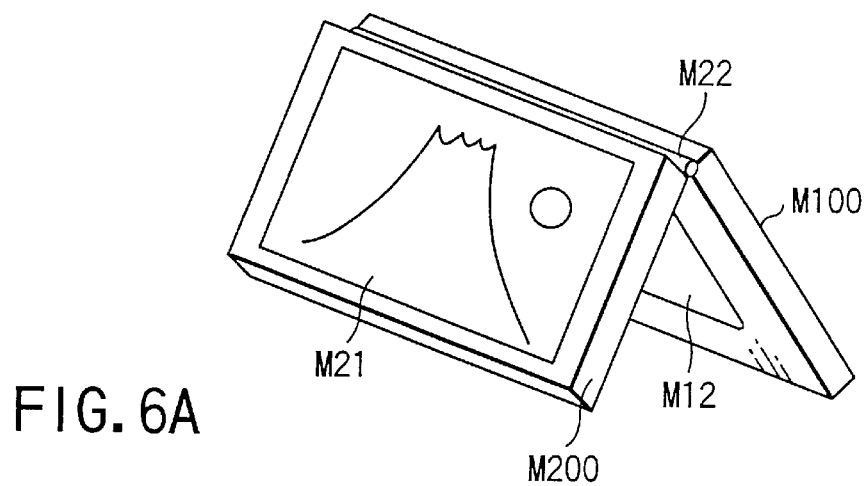
FIGS. 6A and 6B are perspective views showing a still further use mode of this multi-purpose information processing apparatus.

The mode shown in FIG. 3 matches with the use conditions of an ordinary notebook PC. Further, as shown in FIG. 4, the positional relationship between the information input section M20 and the information display section M21 may be reversed, not only they can be opened 180° as shown in FIG. 5, but also after being opened as shown in FIG. 6A, the information display section M21 and the information input section M20 can be placed one on the other in such a way as to face outward as shown in FIG. 6B.

Figure 6B:
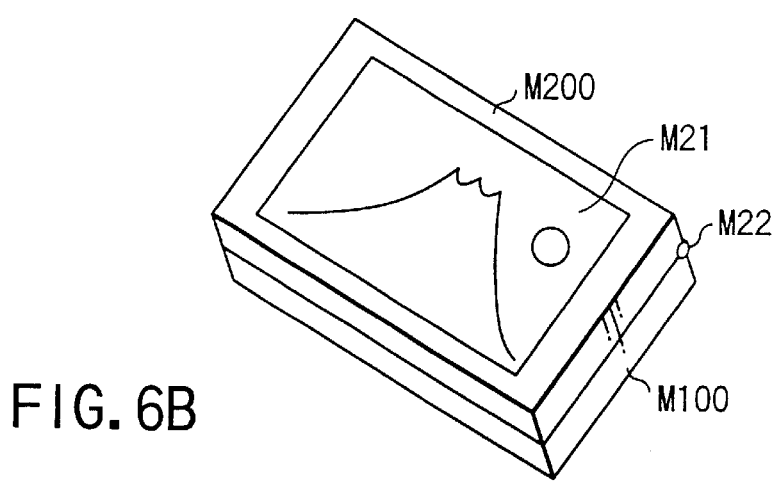

The Windows 98 computer operating system comes equipped with DVD video reproducing software on the OS (Operating System) side, so that when a DVD video disk is used as an information storage medium, one can enjoy video images while carrying the apparatus around in the form shown in FIG. 6B. Further, as will be discussed in detail later, as an information storage medium in which the program of an information management layer that has been created as part of the OS is loaded, one can easily play back or edit recorded video images together with many friends.

Because this multi-purpose information processing apparatus incorporates a tuner, when an information storage medium having a program for displaying a TV (Television) screen is loaded, one can also see TV video images in the form of FIG. 6B while being on a train. Since this multi-purpose information processing apparatus incorporates a modem, if communications software is recorded in the information storage medium, it is also possible to record necessary information in the recording layer of the information storage medium using a WWW (World Wide Web) line in the night and display the loaded information on the information display section M21 in the form as shown in FIG. 6B on a train to one's office or school.

Conventional notebook PCs typically have a structure in which an information storage medium is placed on a tray which is loaded in and out from the side, and is loaded. The use of a tray, however, requires a mechanism of loading an information storage medium to the information recording/reproducing section, which is a factor to increase the thickness of the whole information processing apparatus. By way of contrast, the multi-purpose information processing apparatus according to this invention has the first point in that a tray from the side is removed, a mechanism for directly loading the information storage medium into the information recording/reproducing section is taken and eliminating the loading mechanism is eliminated, thus achieving a lower cost and a flatter structure, and the opening/closing mechanism portion M12 is arranged at the back of the information input section M20 to thereby guarantee the strength of the entire multi-purpose information processing apparatus.

The multi-purpose information processing apparatus according to this invention has the second point in that it does not have a built-in magnetic recording apparatus, such as HDD, a soft OS is stored in a non-volatile semiconductor memory, such as EEPROM (Electrically Erasable and Programmable Read Only Memory) and a higher-rank OS and application software are provided on the information storage medium, thus making the apparatus more compact, lighter and lower in cost.

Figure 7:
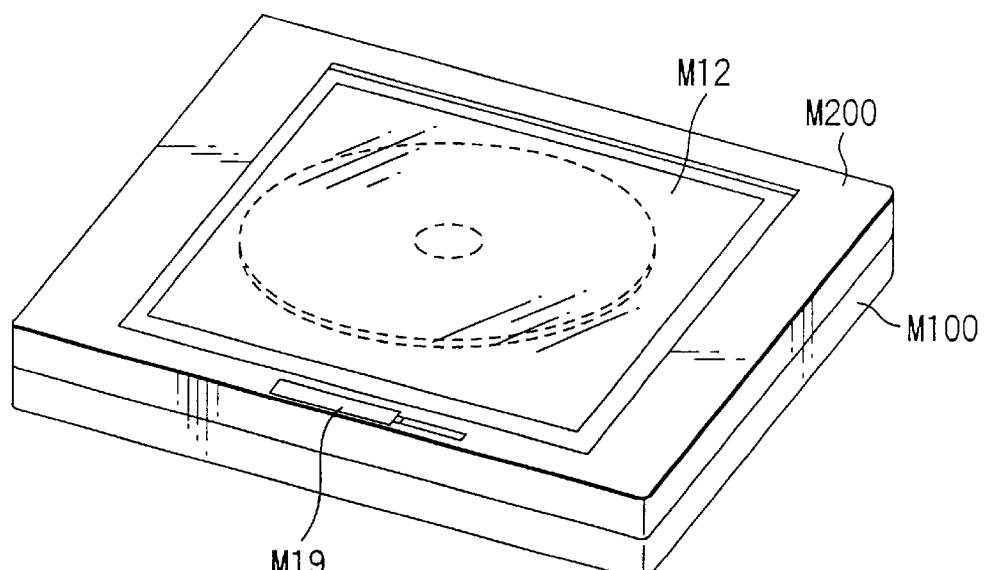
FIG. 7 is a perspective view depicting a modification of this multi-purpose information processing apparatus.

The multi-purpose information processing apparatus according to this invention is not limited to the structure shown in FIG. 1, but may take a structure as shown in, for example, FIG. 7, in which the opening/closing mechanism portion M12 is arranged at the back of the information display section M21, i.e., the information recording/reproducing section is located on a body M200 having the information display section M21.

A program may be recorded for usage on a recordable information storage medium, such as an MO (Magneto Optics) disk or PD disk, as an information storage medium that is used in the multi-purpose information processing apparatus according to this invention. In this case, however, the program should be recorded on each of MO disks and PD disks, and recording involves a cost.

A CD-ROM or DVD-ROM disk is characterized in that information is recorded by a protruding and recessed structure on the surface and this protruding and recessed structure is formed in a very short period of time by a method, such as injection, at the time of forming a disk substrate, so that an information storage medium can be produced at a low cost.

From the above characteristic, the feature of this invention lies in the structure of the information storage medium which has a multi-layer disk structure that has two information layers, the first layer being an information reproducing layer where information such as a program is recorded in the protruding and recessed structure as in a CD-ROM or DVD-ROM disk, with a recording layer capable of recording information using condensed light, such as that of a CD-R (Recordable), CD-R/W (Rewritable), DVD-R and DVD-RAM disks, being located on the second layer.

A description will now be given of the details of the above-described multi-purpose information processing apparatus.

In FIG. 1, this multi-purpose information processing apparatus has a first body M100 of a thin box shape, and a second body M200 of a thin box shape which is attachable and detachable and openable and closable to the first surface side (inner surface side) of the first body M100 and can be stacked on and open to the first body M100. Provided on the outer surface of the first body M100 are a dent section M13 and the opening/closing mechanism portion M12 which can open and close this dent section M13. A recording medium loading section which can allow, for example, an information storage medium (disk) to be loaded or unloaded is constructed in the dent section M13.

The point of rotational support of the opening/closing mechanism portion M12 corresponds to one side of the dent section M13 and lock mechanisms M18 and M19 are provided at its free rotational end and the edge of the dent section M13 which corresponds that end to lock the opening/closing mechanism portion M12 when it is closed. A chassis M11 is arranged horizontal at the bottom of the dent section M13 and a turn table M15 on which a disk is to be placed is exposed at the cutaway portion in the center of the chassis. Further, a spindle which coaxially engages with the center hole of the disk protrudes from the center of the turn table M15. The opening/closing mechanism portion M12 is also provided with a clamper M17 for pressing the disk when the it is closed.

Further, a thin and long cutaway portion is formed in the chassis M11 and a head mechanism M16 is constructed in such a way as to be reciprocatable along this cutaway portion. The direction of this reciprocation is diagonal to the rectangular dent section M13.

Figure 2:
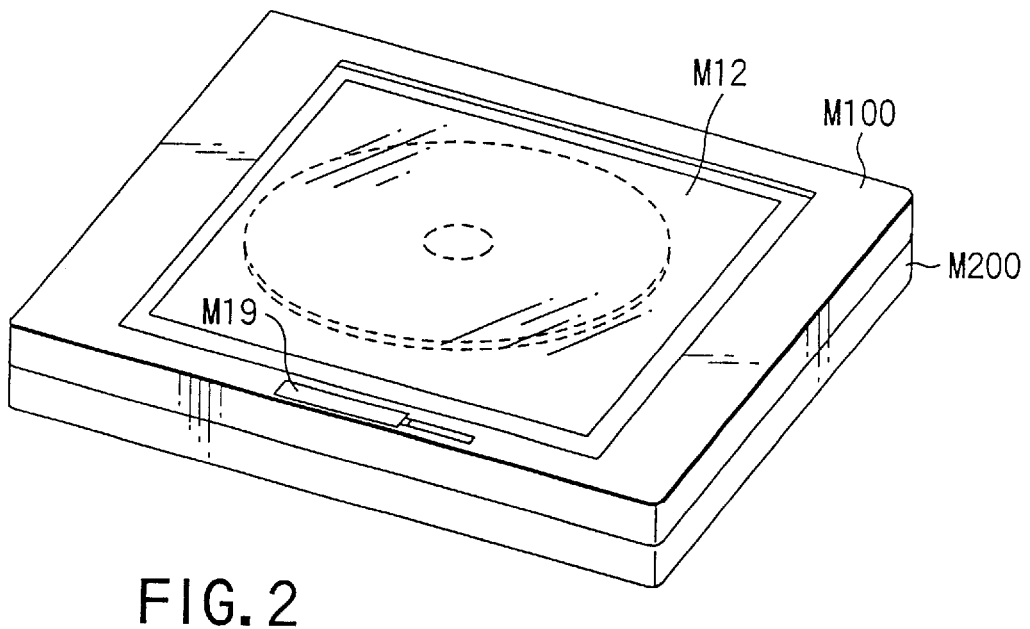
FIG. 2 is a perspective view depicting the opening/closing mechanism portion (lid) of this multi-purpose information processing apparatus closed.

FIG. 2 shows the outward appearance of the opening/closing mechanism portion M12 when closed. A part of the opening/closing mechanism portion M12 is formed of a transparent member, so that it is possible to confirm whether or not a disk is loaded inside.

FIG. 3 shows the first body M100 lifted up from the second body M200 and open. The first and second bodies M100 and M200 have their one side portions coupled together by a coupling mechanism M22 so that they can turn with respect to each other.

With this structure, the information input section M20 for operating the apparatus is provided as, for example, a keyboard, on the inner surface of the first body M100, so that a key operation can be performed. The information display section M21 which uses a liquid crystal panel is provided on the inner surface side of the second body M200, so that the aforementioned disk can be played back to see its video images.

The information input section M20 is not limited to a mechanical keyboard, but may be constructed as a display section. That is, it may be constructed in such a way as to display images of multiple keys so that a user click and designate an arbitrary key with a cursor or touch and designate an arbitrary key with an operation pen M23. In the case of using the operation pen M23, touch electrodes of transparent electrodes are provided on the front surface of the information input section M20. Alternatively, a system in which the operation pen M23 itself recognizes an image and reads a designated key is employed.

Although the information input section M20 is provided on the inner surface of the first body M100 and the information display section M21 is provided on the second body M200, they may be reversed. That is, the information display section M21 may be provided on the inner surface of the first body M100 and the information input section M20 may be provided on the second body M200.

FIG. 4 illustrates another use mode. Although an operation is performed as seen from the second body M200 side in the mode in FIG. 3, the apparatus can be used in the reverse mode. That is, as shown in FIG. 4, the apparatus may be used with the first body M100 arranged flat and the second body M200 set upright.

In this case, the direction of the operational keys and the up and down display direction of the screen are reversed to those of the embodiment in FIG. 3.

FIG. 5 shows a different use mode. Although the first and second bodies M100 and M200 are used with some angle therebetween in the previous use mode, the mode is not limited to this mode, but they may be used in a flat and open form as shown in FIG. 5. Such a mode is feasible by modifying the coupling mechanism M22. For example, a plurality of lock positions may be provided within the range of a rotational angle or the first and second bodies M100 and M200 may be so set as to be sufficiently turn at a wide rotational angle about the point of rotational support and a load is increased at the point of rotational support so that the posture can be maintained at an arbitrary position.

Therefore, the use mode may be in such a state that the first and second bodies M100 and M200 are open at more than 180° as shown in FIG. 6A or in such a state that their outer surface sides are put together as shown in FIG. 6B. Alternatively, as shown in FIG. 7, a structure where the opening/closing mechanism portion M12 is located on the body M200 having the information display section M21.

Figure 8:
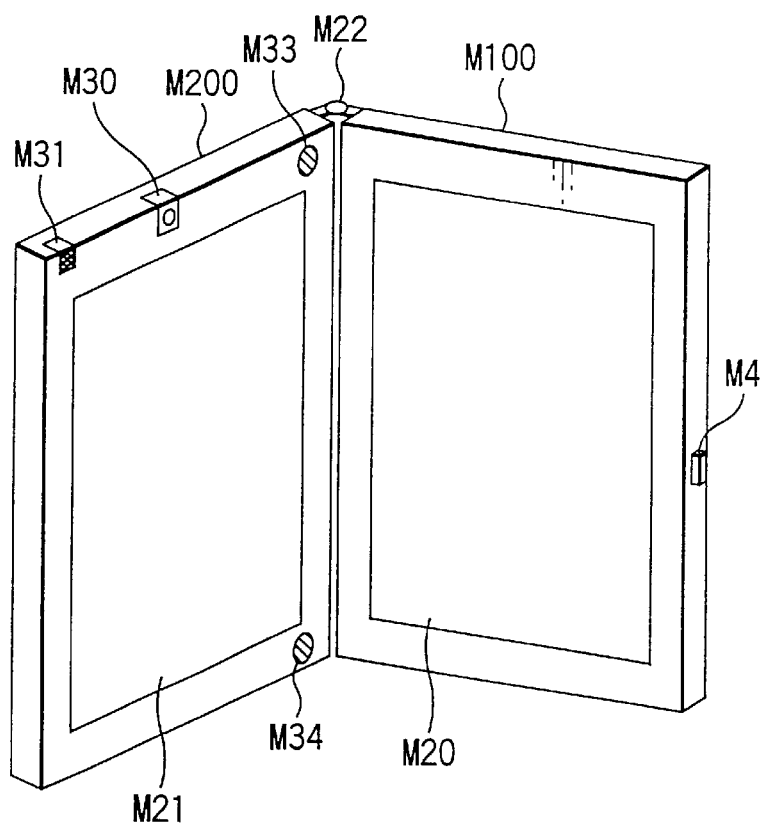
FIG. 8 is a perspective view depicting another modification of this multi-purpose information processing apparatus.

FIG. 8 depicts another modification of the above embodiment. That is, a signal processing apparatus in this multi-purpose information processing apparatus has a function of freely changing the display direction of the screen to an arbitrary direction. Therefore, the apparatus can be used in a vertical form as shown in FIG. 8. Further, in the case of this apparatus, the information input section M20 of the body M100 is an operational section of a display type. When the apparatus is used as, for example, a reproducing apparatus, therefore, it is possible to display operational keys needed for a reproducing apparatus, whereas when the apparatus is used as a TV, it is possible to display operational keys needed for a TV. When the apparatus is used as a recording apparatus, it is possible to display operational keys needed for a recording apparatus.

For data of the operational keys, operational keys information recorded on, for example, a disk may be used or the data may be recorded beforehand as video data in a memory provided inside.

Further, this apparatus is provided with a TV camera section M30 using a CCD (Charge Coupled Device) or the like, a microphone section M31 and speaker sections M33 and M34. This apparatus incorporates a radio tuner and a TV tuner.

Figure 9:
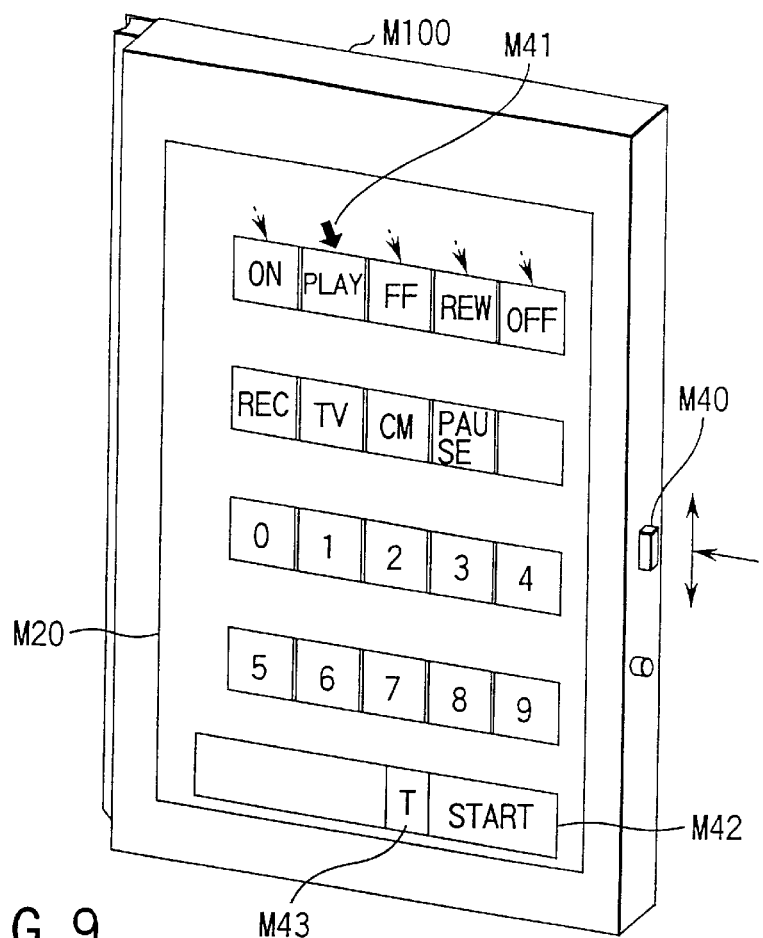
FIG. 9 is a perspective view for explaining a display mode of operational keys of this multi-purpose information processing apparatus and how to operate them.

FIG. 9 shows an example wherein operational keys in the case of performing reproduction and recording of a disk are displayed. The reproduction and recording modes are set by selecting a mode select switch, which is previously provided, though not illustrated.

The keys that are necessary for reproduction and recording are displayed on the information input section M20. And, a cursor M41 for selecting a key appears. Many keys are aligned in the horizontal (row) direction and the vertical (column) direction. An operational button M40 for selecting a key protrudes from a portion of the body M100 and the position of the cursor M41 can be moved by operating this operational button M40. Applying upward or downward force to the operational button M40 can shift the row where the cursor M41 is positioned upward or downward. When the cursor M41 is positioned in a row, it moves in the column direction at a given speed and circulates while specifying the keys on the same row one after another.

FIG. 9 exemplifies the state in which it circulates while specifying the individual keys of the first row. When the operational button M40 is pressed toward the body M100 as the cursor M41 comes to the position of an ON key, the apparatus determines that this key has been selected, and turns on the disk recording/reproducing system to set it in a standby mode. When the operational button M40 is pressed toward the body M100 as the cursor M41 comes to the position of a PLAY key, the apparatus determines that this key has been selected, so that a disk playback mode is set.

To stop playback, the cursor M40 has only to be moved to the first row and the operational button M40 has to be pressed toward the body M100 as the cursor M40 comes to the position of an OFF key.

A description will now be given of the case of executing recording. When the cursor M41 comes to the position of the ON key, the operational button M40 is pressed toward the body M100 to set a standby mode. Next, downward force is applied to the operational button M40 to shift the cursor M41 to the second row. Then, when the cursor M41 comes to the position of a REC key while going around the keys of the second row, the operational button M40 is pressed toward the body M100. Then, TV and CM keys start blinking. This is an inquiry of whether a TV broadcast program is to be recorded or camera recording is carried out. When the TV key is selected here, numeral keys 0 to 9 blink this time, requesting for channel selection. The user adjusts the position of the cursor M41 to select the desired channel. Then, selecting a start key M42 finally starts recording. When a timer setting key M43 is operated without operating the start key M42, a keyboard (not shown) for setting a timer is displayed.

According to the above-described operation method, a key operation can be done with one hand. Of course, the operation is not limited to this operation system but a mouse may be connected to perform an operation.

Figures 10A, 10B:
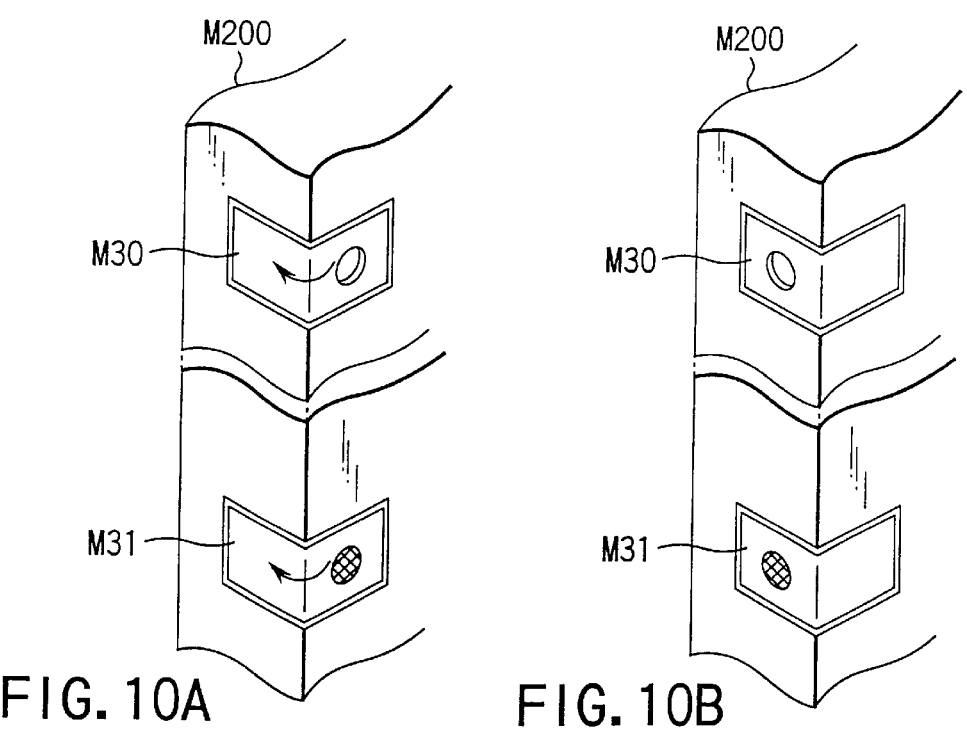
FIGS. 10A and 10B are perspective views showing a modification of a TV camera section and a microphone section of this multi-purpose information processing apparatus.

FIGS. 10A and 10B show an example wherein the directions of the TV camera section M30 and the microphone section M31 mentioned earlier are changed. That is, the TV camera section M30 and the microphone section M31 can change their directions in accordance with the use mode.

If it is possible to change images (switching of images between the first and second bodies M100 and M200) or to freely change the display direction of images in the above-described operation method, the direction of the operation can be set variously. While the above-described example is a display mode suitable for the operation of the operational button M40 with the right hand, it is possible to set a display mode suitable for an operation with the left hand. That is, the operational keys are displayed on the left-hand side and a video image is displayed on the right-hand side.

With the above-described system, the apparatus can be used as a character input device or a so-called word processor. It is also possible to use the apparatus in such a way as to display a main video image on one display section and display a sub video image on the other display section.

Figure 11:
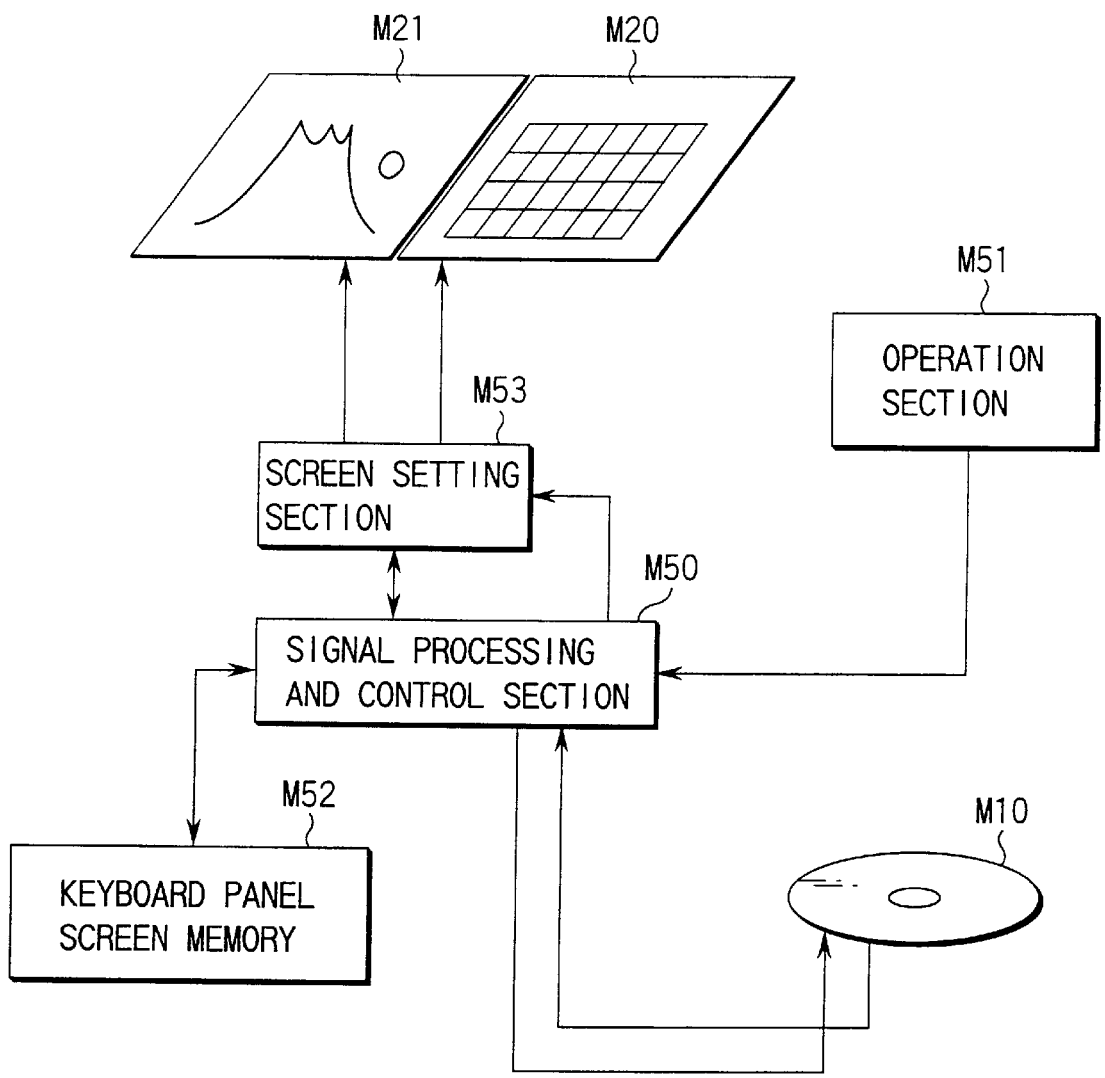
FIG. 11 is a block structural diagram illustrating the schematic structure of internal electrical blocks of the multi-purpose information processing apparatus.

FIG. 11 shows the schematic structure that controls the above apparatus. A signal processing and control section M50 can read information from a disk M10 loaded into a disk loading section and process it and can record information on the disk M10. The signal processing and control section M50 can also process a signal from an operation section M51 (including the aforementioned operational button M40) to perform a process of selecting and determining an operational key. A keyboard panel image memory M52 holds a keyboard panel image read from the disk M10 or a keyboard image previously provided. The signal processing and control section M50 can read keyboard panel image information from the memory M52 and display it on the information input section M20.

A screen setting section M53 can change the direction of the screen or can execute switching between an image to be displayed on the information display section M21 and an image to be displayed on the information input section M20.

Figure 12A:
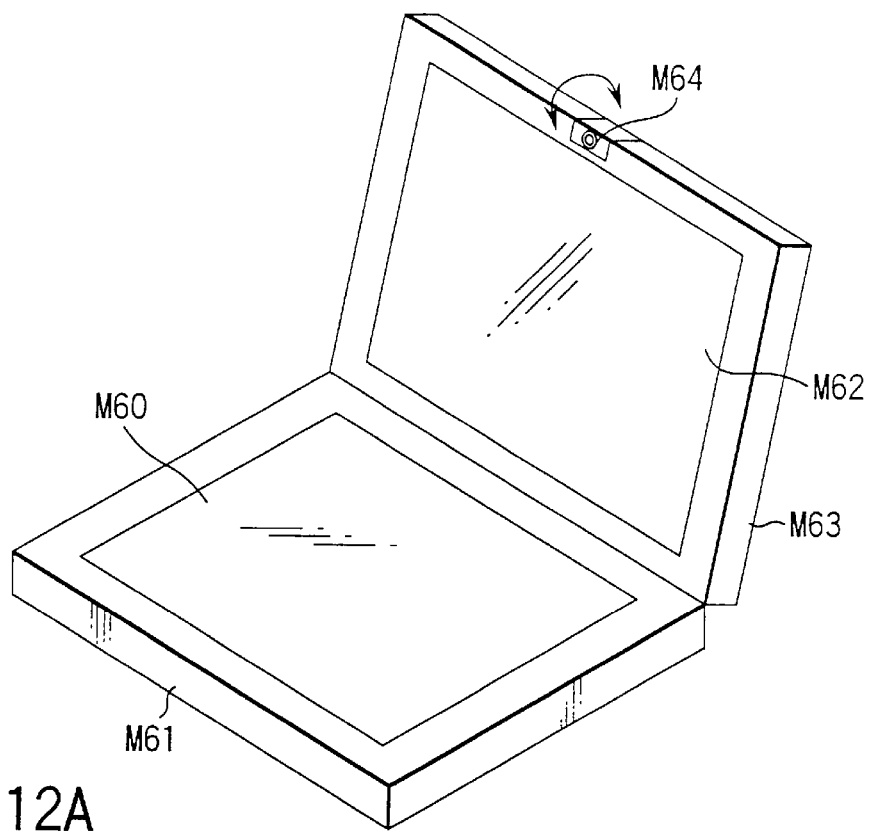
FIGS. 12A and 12B are perspective views respectively showing further modifications of the TV camera section and the microphone section of this multi-purpose information processing apparatus.

FIG. 12A shows an example in which a notebook PC type multi-purpose information processing apparatus, which has a main body M61 having a keyboard M60 and a lid body M63 having a display section M62 supported rotatable to this main body M61, is attached with a TV camera section M64 in such a way that its direction can be changed. In this case, the TV camera section M64 is provided at the center portion of the freely rotatable end of the lid body M63 and is rotated 180° to the user side and to the opposite side to the user with the lid body M63 in between as indicated by the arrows in the diagram.

Figure 12B:
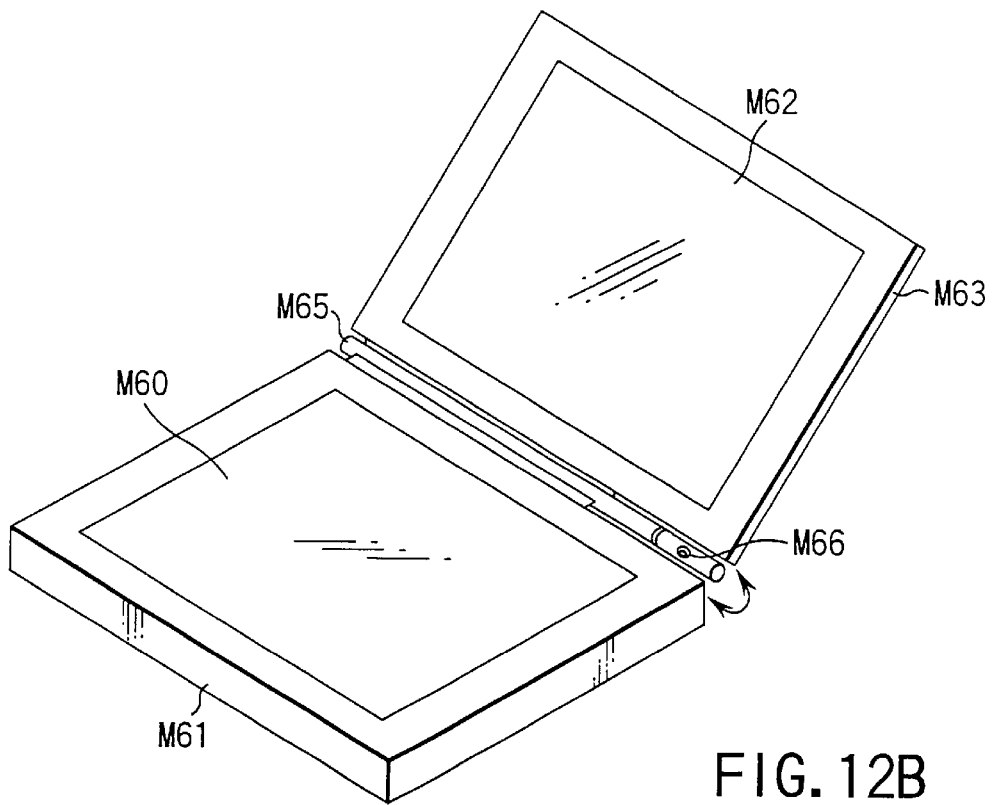

Further, as shown in FIG. 12B, a TV camera section M66 may be provided at one end of a rotary shaft M65, which rotatably couples a main body M60 of a notebook PC multi-purpose information processing apparatus and the lid body M63, in such a way that it can rotate coaxial to the rotary shaft M65.

Figure 13A:
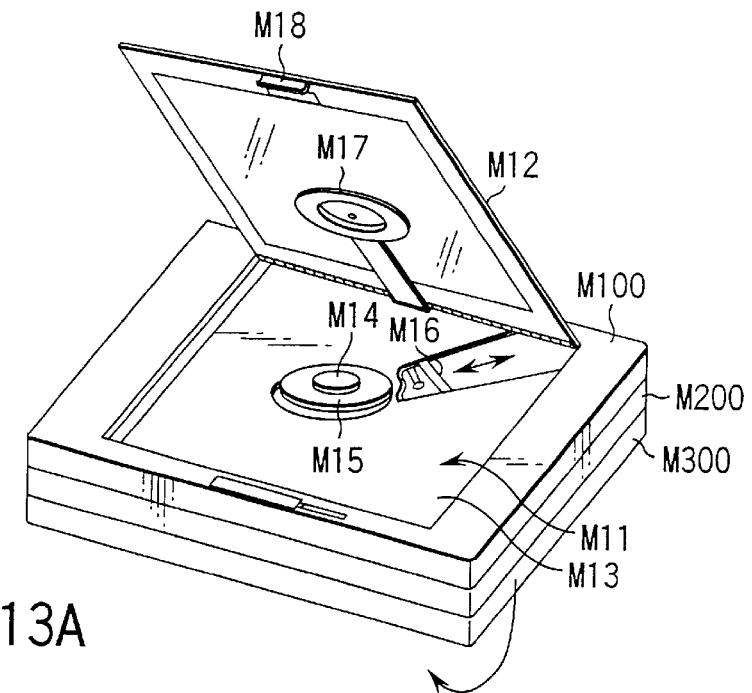
FIGS. 13A through 13C are perspective views illustrating another embodiment of a multi-purpose information processing apparatus according to this invention.
Figure 13B:
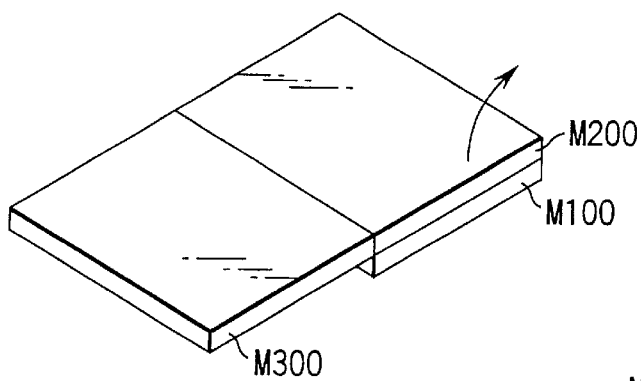
Figure 13C:
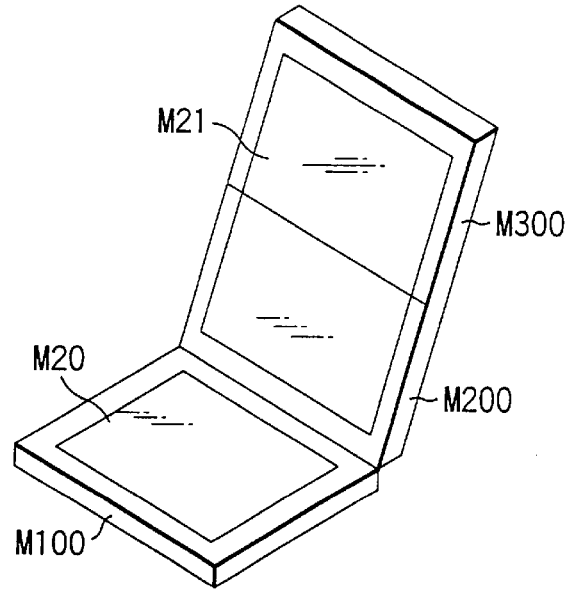

FIG. 13A shows a multi-purpose information processing apparatus so designed as to further have a third body M300 of a thin box shape stacked with respect to the stacked first and second bodies M100 and M200. In this case, when the body M300 is so opened as to be flat with the body M200 as shown in FIG. 13B and then the bodies M200 and M300 are set upright to the body M100 as shown in FIG. 13C, the information display section M21 which continuously stretches over the two bodies M200 and M300 is constructed.

Figure 14A:
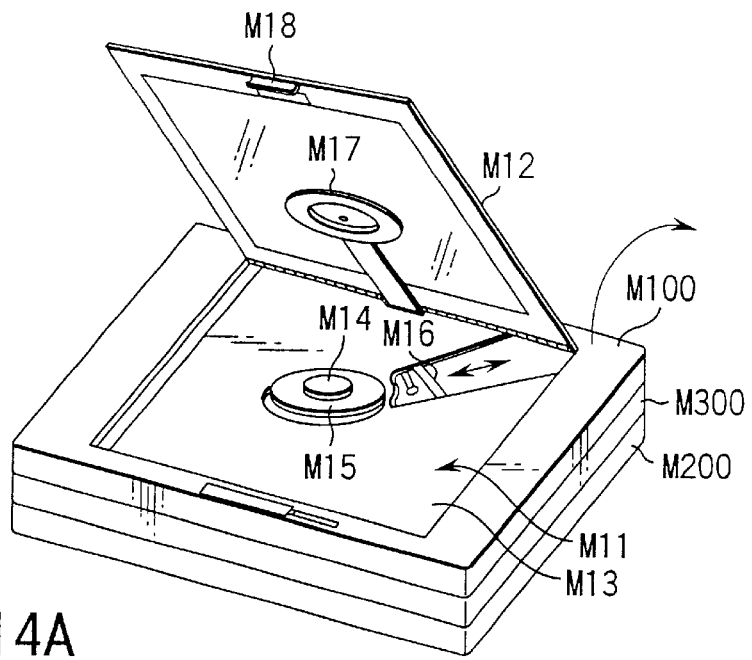
FIGS. 14A through 14C are perspective views illustrating a further embodiment of a multi-purpose information processing apparatus according to this invention.

FIG. 14A shows a multi-purpose information processing apparatus so designed as to have the third body M300 of a thin box shape inserted between the first and second bodies M100 and M200. In this case, the body M100 and the body M200 are connected together by a flexible board M70 so as to extend over the thickness of the body M300. And, a display function is provided inside this flexible board M70 or on the side that faces the end portion of the body M300.

Figure 14B:
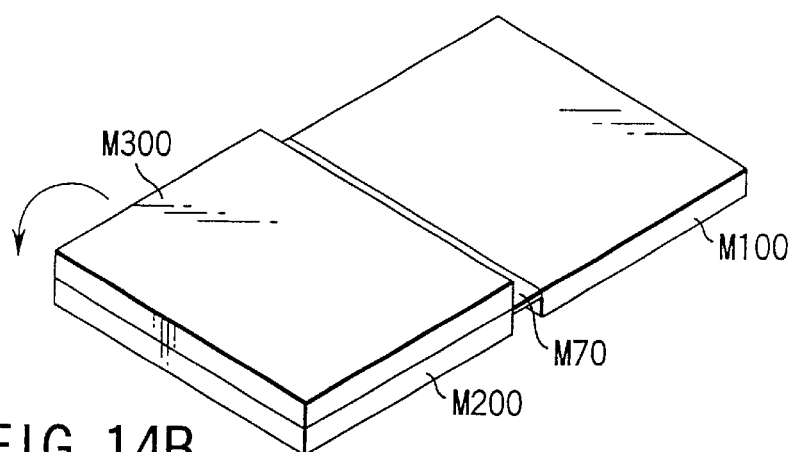
Figure 14C:
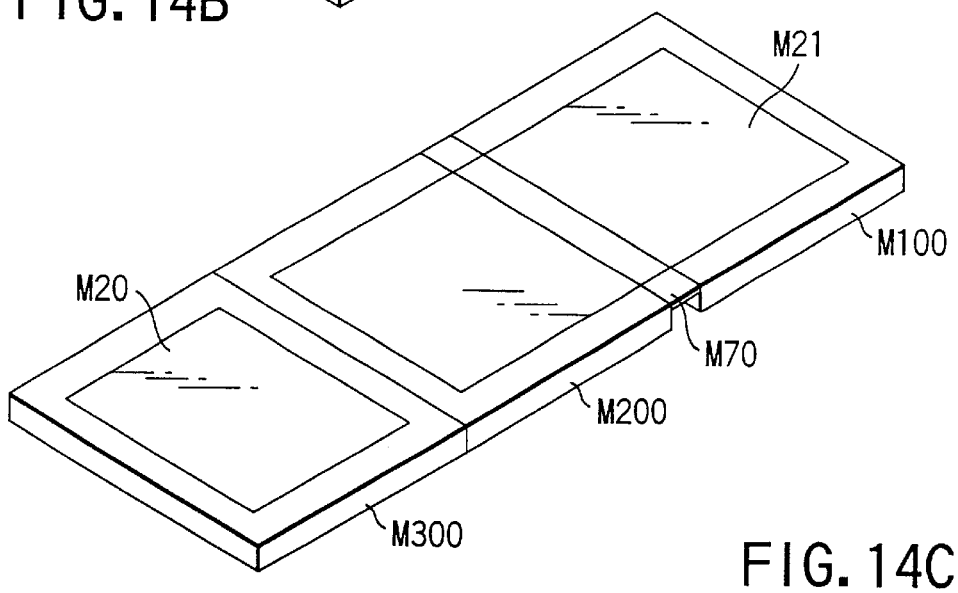

When the body M100 is so opened as to be flat with the body M200 as shown in FIG. 14B and then the body M300 is so opened as to be flat with the body M200 as shown in FIG. 14C, the information display section M21 which continuously stretches over the two bodies M100 and M200 via the flexible board M70 is constructed. In this case, the information input section M20 is provided on the body M300.

Figure 15A:
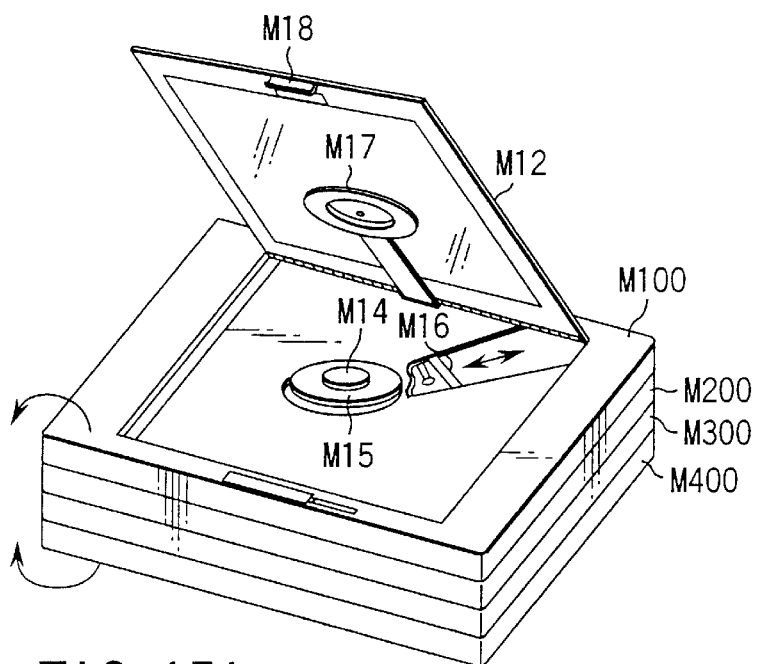
FIGS. 15A through 15C are perspective views illustrating a still further embodiment of a multi-purpose information processing apparatus according to this invention.
Figure 15B:
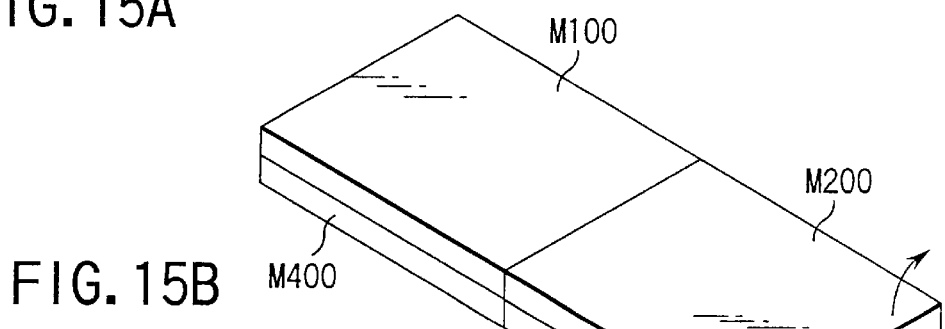
Figure 15C:
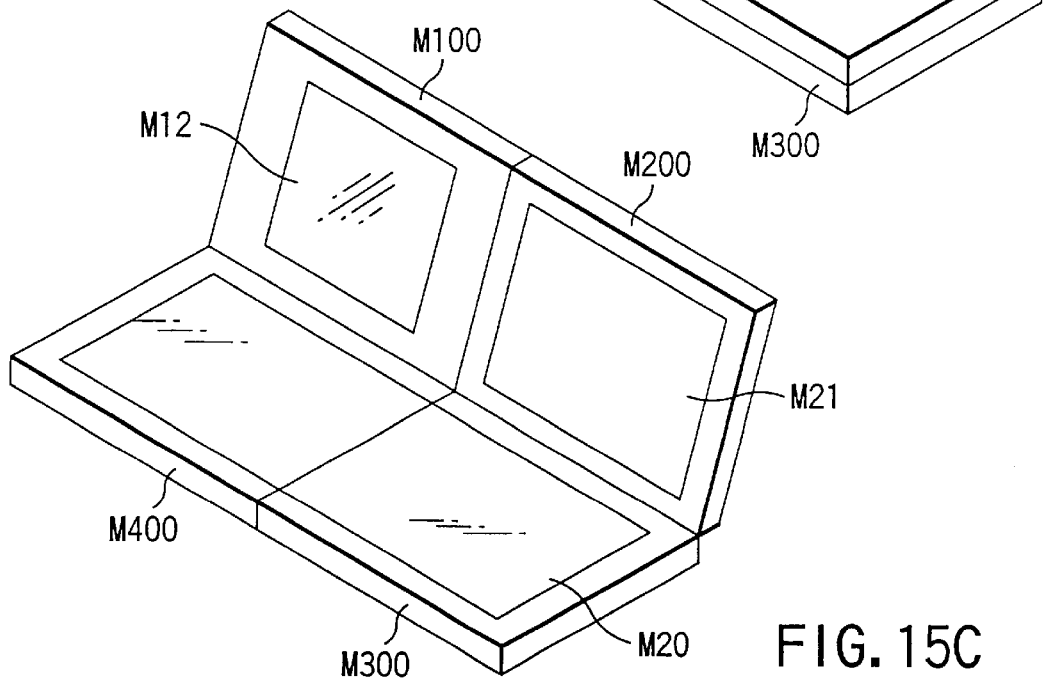

FIG. 15A shows a multi-purpose information processing apparatus so designed as to further have third and fourth bodies M300 and M400 of thin box shapes stacked with respect to the stacked first and second bodies M100 and M200. In this case, when the bodies M100 and M400 are so opened as to be respectively flat with the bodies M200 and M300 as shown in FIG. 15B and then the bodies M100 and M200 are respectively set upright with respect to the bodies M300 and M400 as shown in FIG. 15C, the information input section M20 which continuously stretches over the two bodies M300 and M400 is constructed.

Figure 16A:
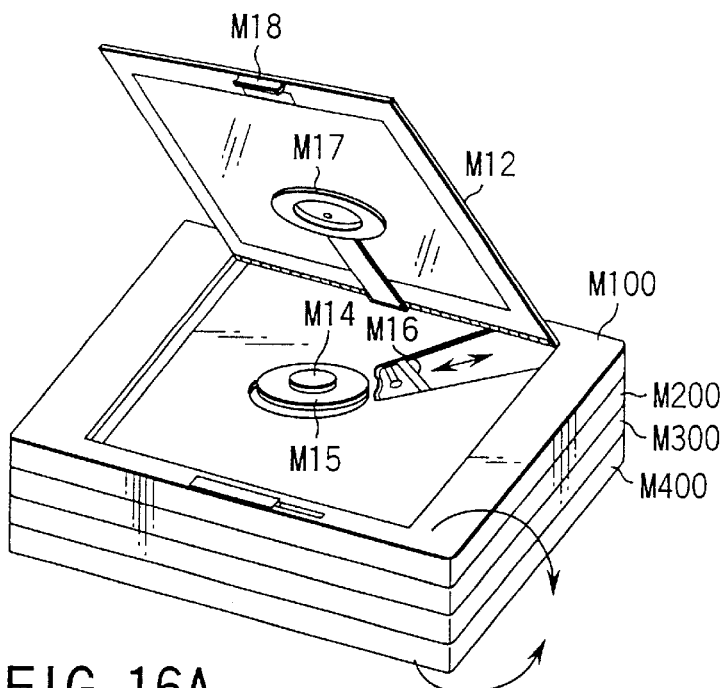
FIGS. 16A through 16C are perspective views illustrating a yet still further embodiment of a multi-purpose information processing apparatus according to this invention.
Figure 16B:
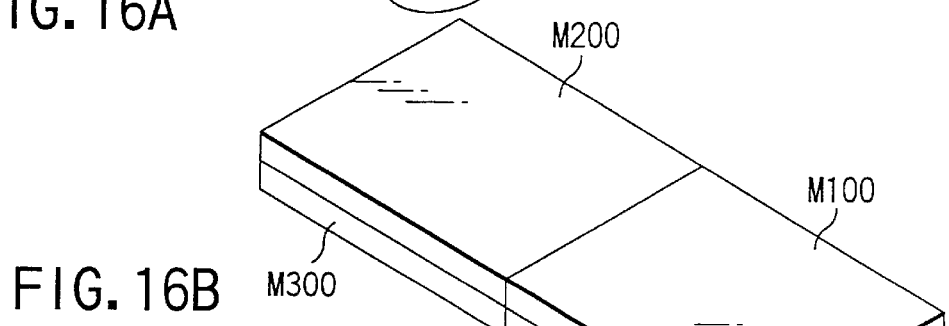
Figure 16C:
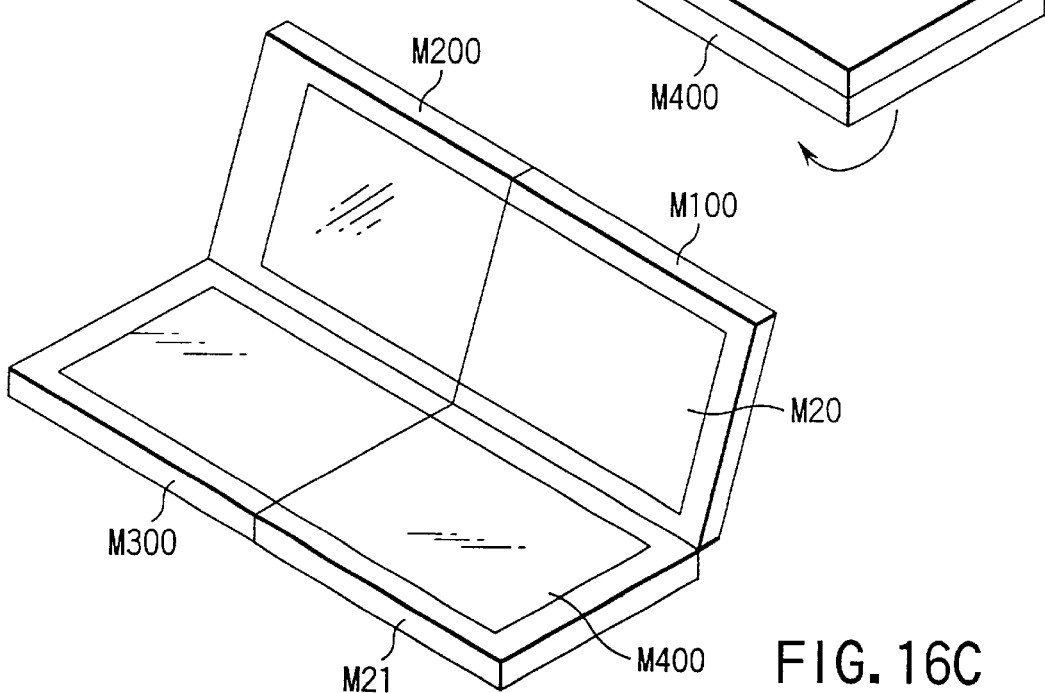

FIG. 16A shows a multi-purpose information processing apparatus so designed as to further have the third and fourth bodies M300 and M400 of thin box shapes stacked with respect to the stacked first and second bodies M100 and M200. In this case, when the bodies M100 and M400 are so opened as to be respectively flat with the bodies M200 and M300 as shown in FIG. 16B and then the bodies M300 and M400 are respectively set upright with respect to the bodies M100 and M200 as shown in FIG. 16C, the information input section M20 which continuously stretches over the two bodies M100 and M200 is constructed and the information display section M21 which continuously stretches over the two bodies M300 and M400 is constructed.

In this case too, it is possible to provide such a structure that the opening/closing mechanism portion M12 is located at the back of the information display section M21, i.e., that the information recording/reproducing section is located on the bodies M300 and M400 which have the information display section M21.

Figure 17A:
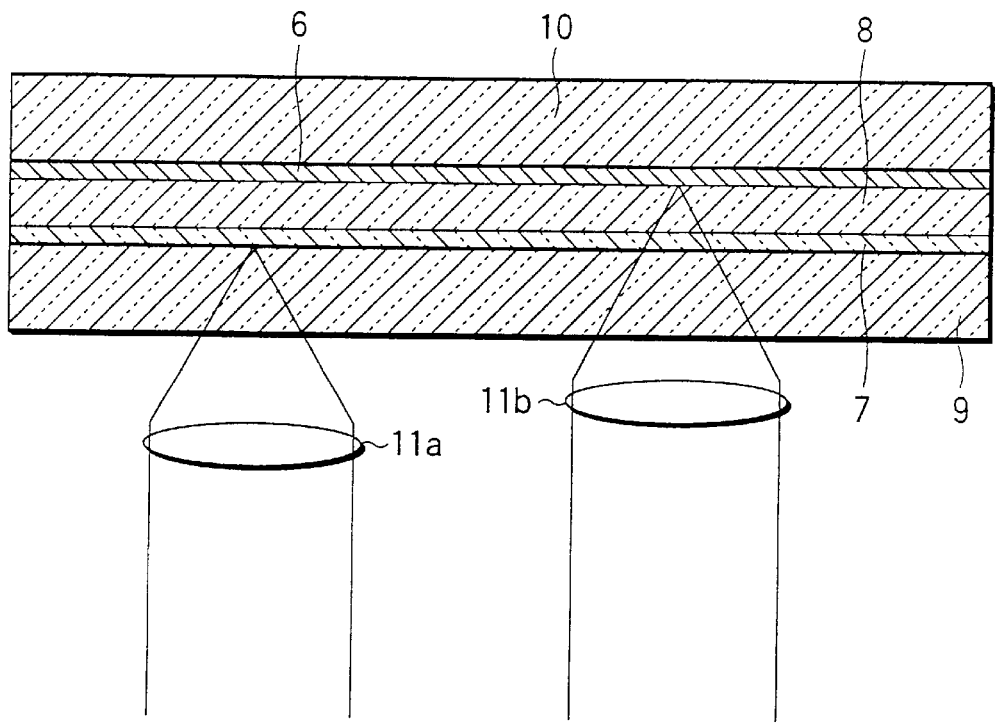
FIGS. 17A and 17B are side cross-sectional views each illustrating one embodiment of an information storage medium having multiple information layers according to this invention.

FIG. 17A shows the structure of the information storage medium according to this invention. This information storage medium has an information reproducing layer 7 and a recording layer 6 as information layers respectively formed on one sides of transparent substrates 9 and 10 with approximately the same thickness so as to be arranged inside and adhered together by a transparent adhesive layer 8.

The surface of one side of the transparent substrate 9 has a minute protruding and recessed structure and the information reproducing layer 7 is formed, half coated, on that surface. An objective lens which condenses a laser beam shifts its position as indicated by 11a and 11b, so that the converging points respectively correspond to the information reproducing layer 7 and the recording layer 6. The transmittance and reflectance of the information reproducing layer 7 are so designed as to be approximately equal to each other, so that the laser beam that has passed the information reproducing layer 7 converges on the recording layer 6.

Figure 17B:
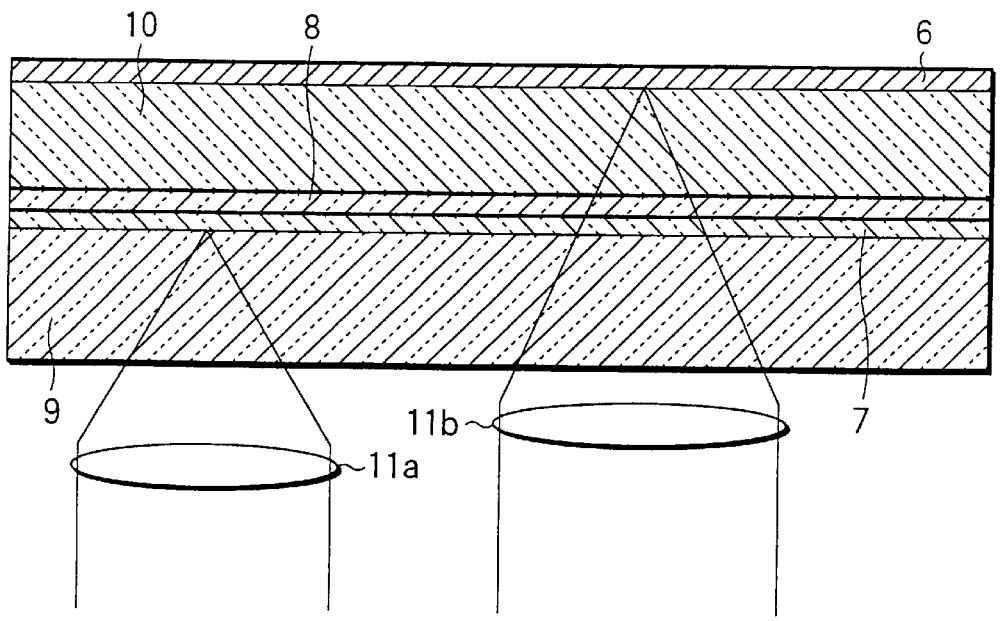

FIG. 17B shows another example the structure of the information storage medium according to this invention. The information reproducing layer 7 and the recording layer 6 are close to each other whereas they are well apart from each other in the previous information storage medium. In this example, the thicknesses of the transparent substrates 9 and 10 are approximately the same.

Although recordable recording layers of, for example, a CD-R, CD-R/W, DVD-R, DVD-RAM and the like as the above information recording layer are included in the scope of this invention, the following will discuss the case where the recording layer of a DVD-RAM disk is used as the recording layer and the reproducing layer of a DVD-ROM disk is used as the information reproducing layer. But, the subject matter of this invention is not limited to that, but is of course adaptable to the recording format of CD-R and the recording format of CD-ROM.

To begin with, the data structure of a DVD-RAM disk will be discussed.

FIGS. 18 through 23 are diagrams for explaining the data structure of a DVD-RAM disk. FIG. 18 is a diagram for explaining the layout of a RAM layer of a double-layer optical disk. Specifically, a lead-in area on the inner peripheral side of the disk comprises an emboss zone having a light reflecting surface with a protruding and recessed shape, a mirror zone whose surface is flat (mirror surface) and a rewritable zone. The emboss zone includes a reference signal zone and a control data zone, and the mirror zone includes a connection zone.

The rewritable zone includes a disk test zone, a drive test zone, a disk ID (identifier) zone and defect management areas DMA1 and DMA2.

A lead-out area on the outer peripheral side of the disk comprises a rewritable zone which includes defect management areas DMA3 and DMA4, a disk ID (identifier) zone, a drive test zone and a disk test zone.

A data area between the lead-in area and the lead-out area is segmented into 24 annual-ring like zones 00 to 23. Each zone has a constant rotational speed but the rotational speed differs between different zones. The number of sectors constituting each zone differs zone by zone. Specifically, the zones on the inner peripheral side of the disk (zone 00 or the like) have higher rotational speeds and fewer constituting sectors. By way of contrast, the zones on the outer peripheral side of the disk (zone 23 or the like) have lower rotational speeds and greater constituting sectors. This layout achieves fast accessibility such as CAV (Constant Angular Velocity) in each zone and achieves high density recording such as CLV (Constant Linear Velocity) over the entire zones.

FIG. 19 is a diagram for explaining the details of the lead-in area and lead-out area in the disk layout.

Recorded in the control data zone in the emboss data zone are the type of the DVD standards to be adapted (DVD-ROM, DVD-RAM, DVD-R or the like) and a part version, a disk size and a minimum read rate, a disk structure (1-layer ROM disk, 1-layer RAM disk, double-layer ROM/RAM disk or the like), a recording density, a data area allocation, a descriptor of a burst cutting area, a linear velocity condition for designating the amount of exposure at the recording time, reading power, peak power, bias power and information about the production of the medium.

In other words, information about the whole information storage medium, such as physical sector numbers indicating the recording start and recording end positions, information of the recording power, recording pulse width, erasing power, reproducing power, linear velocities at the recording and erasing times and so forth, information on the recording, reproducing and erasing characteristics, and information about the production of the information storage medium, such as the production number of each disk have been recorded beforehand in this control data zone.

The rewritable data zones of the lead-in and lead-out areas are each provided with a specific disk name recording area for each medium, a test recording area (for checking the recording and erasing conditions) and a management information recording area associated with a defect area in the data area. By using those areas, optimal recording can be performed on each disk.

The individual zones 00 to 23 of the data area are physically arranged on the disk, and have a guard area for distinguishing a data use area between zones in addition to the data area (user areas+spare areas) which is actually used. By way of contrast, groups are assigned to the data area which is actually used.

Figure 20:
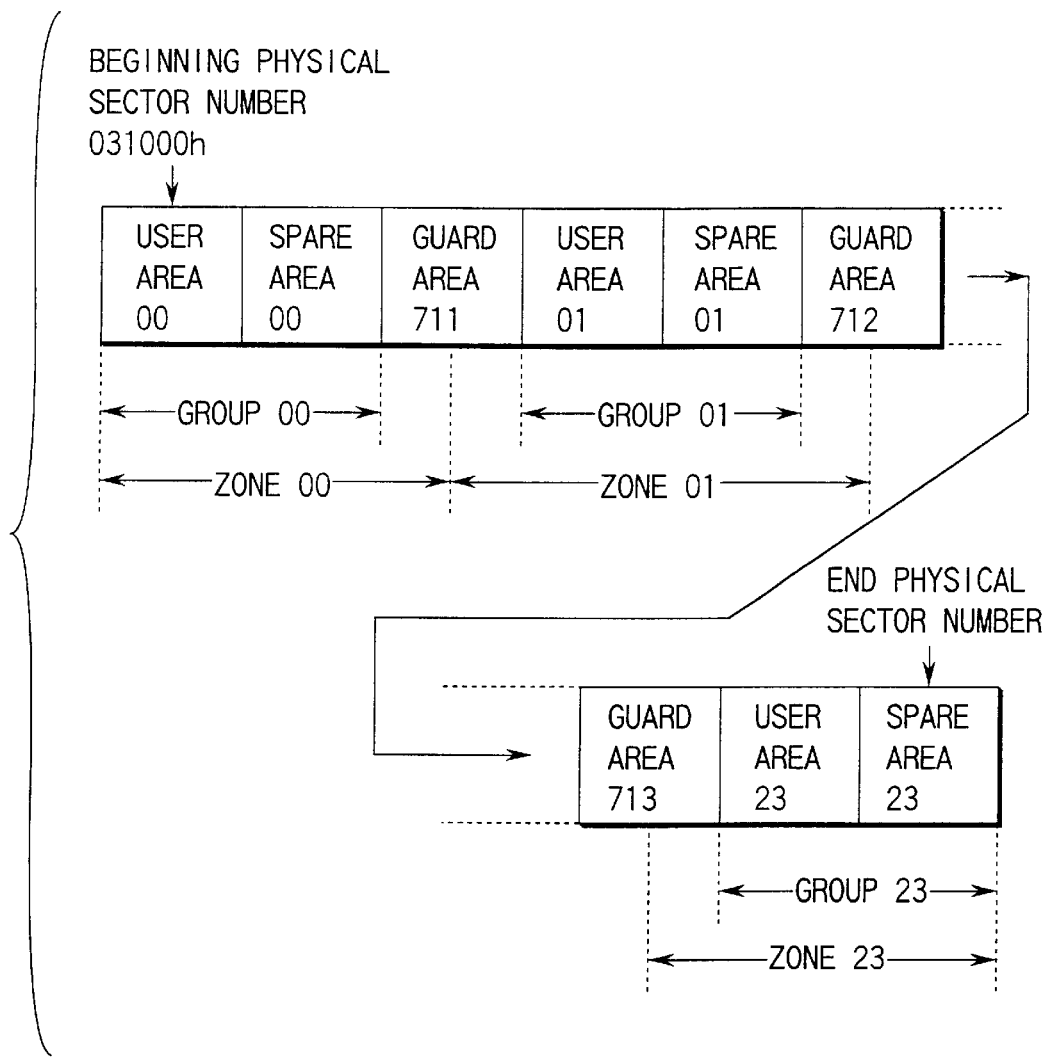
FIG. 20 is a diagram for explaining the relationship between the zones and groups of a data area of this DVD-RAM disk.

FIG. 20 shows the relationship between the groups and zones. A group 00 separated by a guard area 711 includes a user area UA00 which starts at the physical sector number 031000h of the disk and a spare area SA00, and a group 01 separated by the guard area 711 and a guard area 712 includes a user area UA01 and a spare area SA01. Likewise, a group 23 separated by a guard area 713 on the outermost peripheral side of the disk includes a user area UA23 and a spare area ending at the last physical sector number of the disk.

When an optical disk (DVD-RAM disk) having this structure is set to an unillustrated disk drive, it is possible to perform a process of changing the rotational speed of the disk while passing the guard area. At the time an unillustrated optical head seeks from the group 00 to the group 01, for example, the rotational speed of the disk 10 is changed to N01 from N00 while passing the guard area 711.

FIG. 21 is a diagram for explaining the details of the data area in the disk layout. To 24 zones, the same number of groups are assigned and each group includes a pair of a user area to be used for data recording and a spare area to be used in a replacement process. The user area and spare area of each group lie in the zone of the same rotational speed, and those with smaller group numbers belong to a fast rotation zone while those with larger group numbers belong to a slow rotation zone. While the groups in the slow rotation zone have greater number of sectors than the groups in the fast rotation zone, the slow rotation zone has a larger rotational radius of the disk, so that the physical recording density on the disk becomes nearly uniform over the entire zones (entire groups).

In each group, the user area is located on the side where the sector number is smaller (i.e., on the inner peripheral side on the disk) and the spare area is located on the side where the sector number is larger (i.e., on the outer peripheral side on the disk). This allocation of sector numbers corresponds to a way of arranging the user area UA and spare area SA on the disk in FIG. 20.

Figure 22:
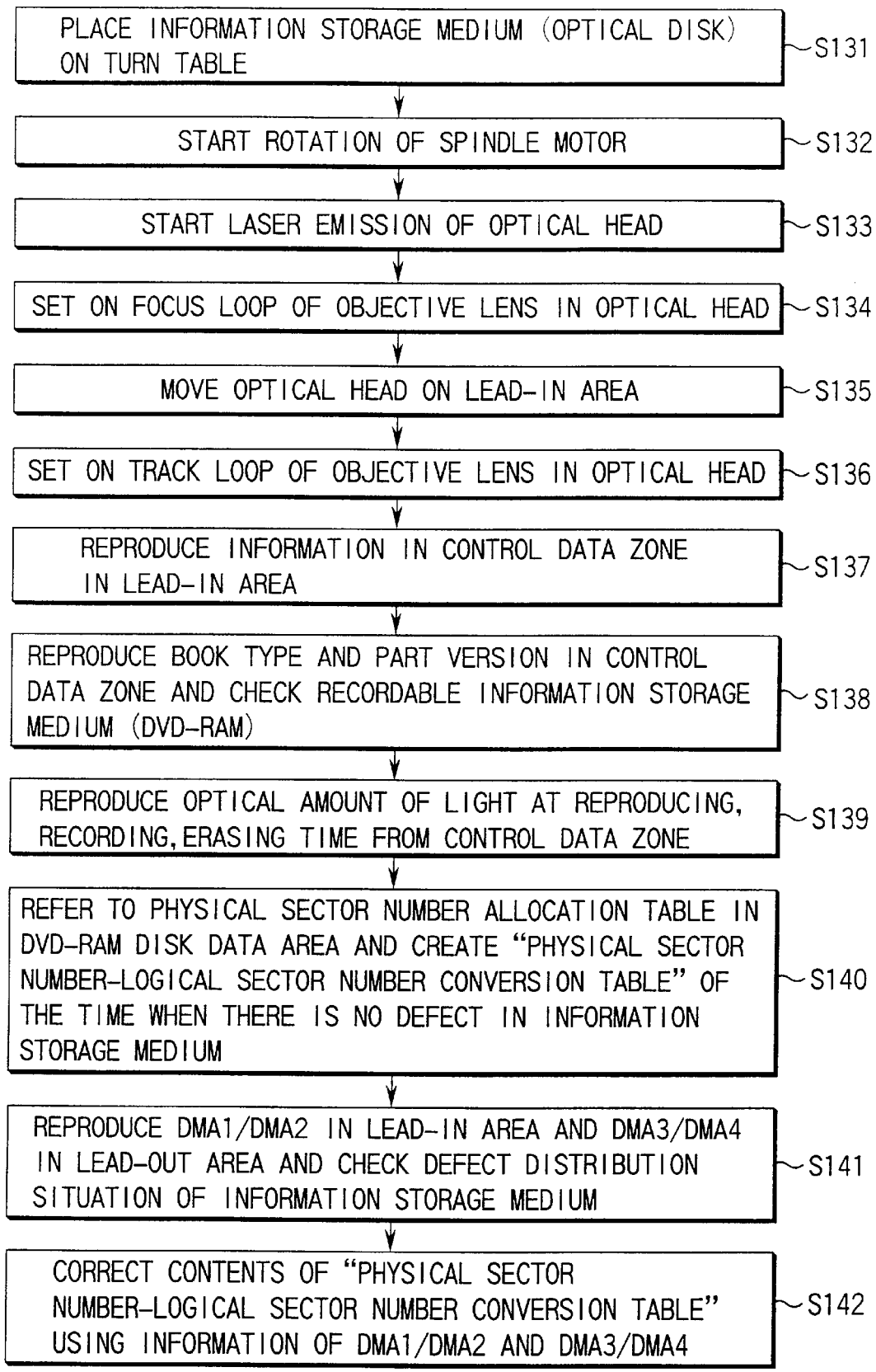
FIG. 22 is a flowchart for explaining procedures of setting a logical number of this DVD-RAM disk.

FIG. 22 shows procedures of setting a logical block number in the information recording/reproducing apparatus. In this routine, it is important to identify a DVD-RAM. It is also important to detect whether or not there is a defect and to correct a conversion table if there is a defect.

Some methods of processing a defect produced in a user area will now be explained. Before that, the defect management areas DMA1 to DMA4 necessary for the defect processing and the associated matter will be discussed.

[Defect Management Area]

The defect management areas DMA1 to DMA4 include information of the structure of the data area and defect management and consist of, for example, 32 sectors. The two defect management areas DMA1 and DMA2 are located in the lead-in area of the optical disk (DVD-RAM disk) and the other two defect management areas DMA3 and DMA4 are located in the lead-out area of the optical disk. Reserve sectors (spare sectors) are added following the individual defect management areas DMA1–DMA4 as needed.

Each of the defect management areas DMA1–DMA4 consists of two ECC (Error Checking and Correcting) blocks. The first ECC block of each of the defect management areas DMA1–DMA4 includes a disk definition information structure DDS (Disk Definition Structure) and a primary defect list PDL (Primary Defect List).

The second ECC block of each of the defect management areas DMA1–DMA4 includes a secondary defect list SDL (Secondary Defect List). The four primary defect lists PDLs of the four defect management areas DMA1–DMA4 have the same contents, and the four secondary defect lists SDLs have the same contents.

While the four disk definition information structures DDSs of the four defect management areas DMA1–DMA4 basically have the same contents, pointers to the PDLs and SDLs of the four defect management areas have different contents.

Here, a DDS/PDL block means an ECC block which includes DDS and PDL. An SDL block means an ECC block which includes SDL.

The following are the contents of the individual defect management areas DMA1–DMA4 after the optical disk (DVD-RAM disk) is initialized.

(1) The first sector of each DDS/PDL block includes DDS.

(2) The second sector of each DDS/PDL block includes PDL.

(3) The first sector of each SDL block includes SDL.

The block lengths of the primary defect list PDL and the secondary defect list SDL are determined by their numbers of entries. Unused sectors in the individual defect management areas DMA1–DMA4 are written with data FFh. All spare sectors are written with 00h.

[Disk Definition Information]

The disk definition information structure DDS consists of a table having a length of one sector. This DDS has contents that define a disk initializing method and the start addresses of PDL and SDL. The DDS is recorded in the first sector of each of the defect management areas DMA1–DMA4 when disk initialization is completed.

[Partitioning]

During disk initialization, the data area is separated into 24 consecutive groups 00 to 23. A plurality of buffer blocks are arranged at the head of each separated zone, excluding the first zone 00 and the last zone 23. Each group completely covers a single zone, excluding the buffer blocks.

Each group has a full block of a data sector (user area) and a following full block of a spare sector (spare area).

[Spare Sector]

A defect sector in each data area is replaced (changed) to a normal sector by a predetermined defect management method (verification, slipping replacement, skipping replacement, linear replacement). A spare sector block for this replacement is included in the spare area of each group.

Note that an optical disk can be initialized before use, this initialization can be executed regardless of verification.

A defect sector is processed by a slipping replacement process (Slipping Replacement Algorithm), skipping replacement process (Skipping Replacement Algorithm) or linear replacement process (Linear Replacement Algorithm). The total number of entries that are listed in the PDL and SDL by those processes (Algorithms) is set to equal to or less than a predetermined number, for example, 4092.

[Initialization]

In the initialization of a disk, the four defect management areas DMA1–DMA4 are recorded before the first use of that disk. The data area is partitioned into 24 groups 00 to 23. Each group includes multiple blocks for the data sectors (user areas) and subsequent multiple spare blocks (spare areas). Those spare blocks can be used for replacement of defect sectors.

At the time of initialization, each group can be verified (certified). This specifies a defect sector found in the initialization stage, so that it is automatically skipped at the time of usage.

Parameters of all the disk definition information structures DDSs are recorded in the four DDS sectors. The primary defect lists PDL and the secondary defect lists SDL are recorded in the four defect management areas DMA1–DMA4. In the first initialization, the update counter in SDL is set to 00h and all reserve blocks are written with 00h.

[Verification/Certification]

In verifying a disk, the data sectors (user areas) and spare sectors (spare areas) in each group are verified. This verification can be accomplished by carrying out read and write checking of the sectors in each group.

A defect sector which is found during verification is processed by, for example, slipping replacement. This defect sector should not used for reading and writing.

When the spare sectors in the zones of the disk are used up during verification, that disk is determined as no good and should not be used thereafter.

When a disk is used for data storage for a computer, the aforementioned initialization+verification is performed, but when a disk is used for video recording, video recording may take place without executing the aforementioned initialization+verification.

Figure 23:
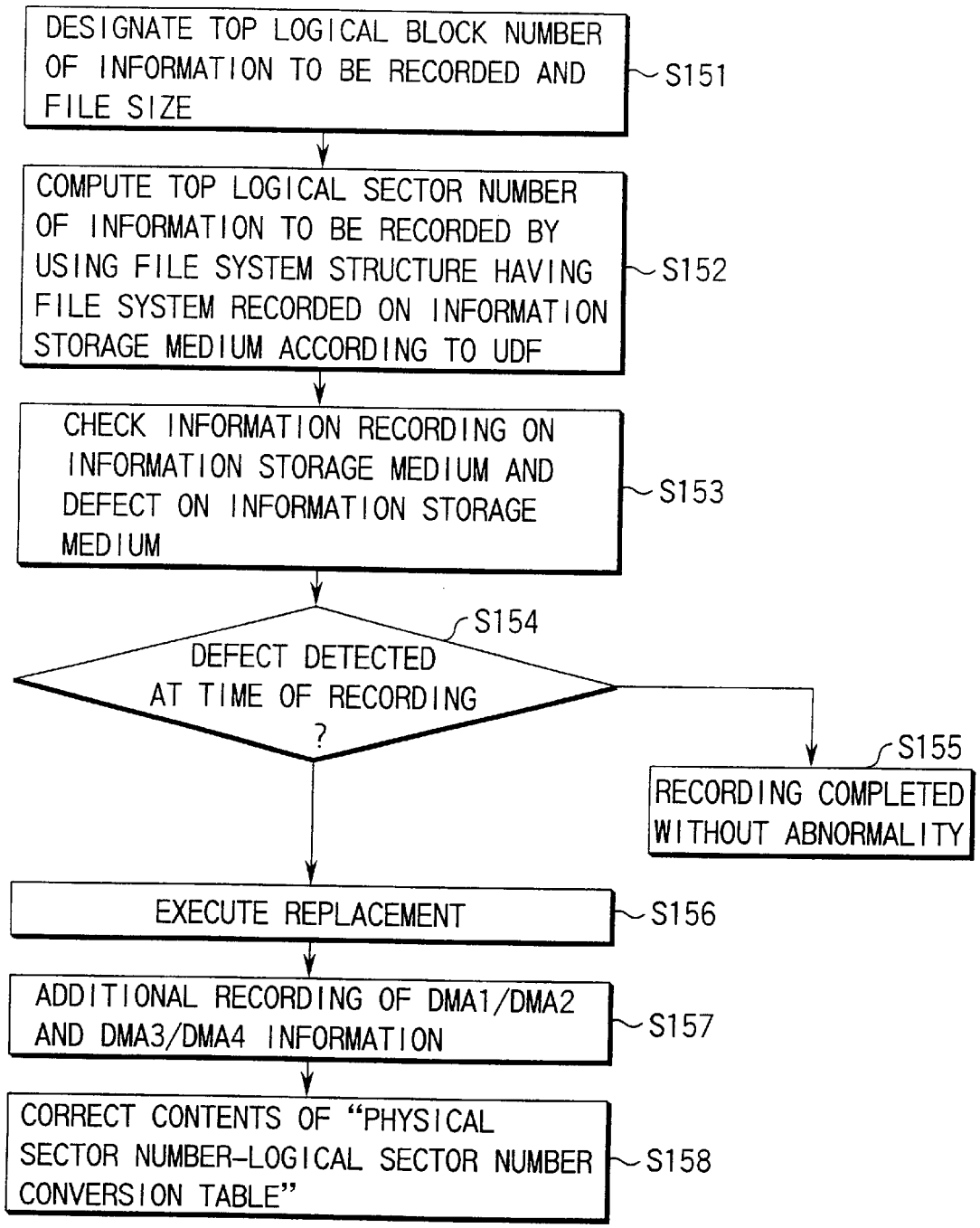
FIG. 23 is a flowchart for explaining procedures of correcting a defect on this DVD-RAM disk.

FIG. 23 shows the procedures of a defect processing operation in the information recording/reproducing apparatus.

Figures 24, 25:
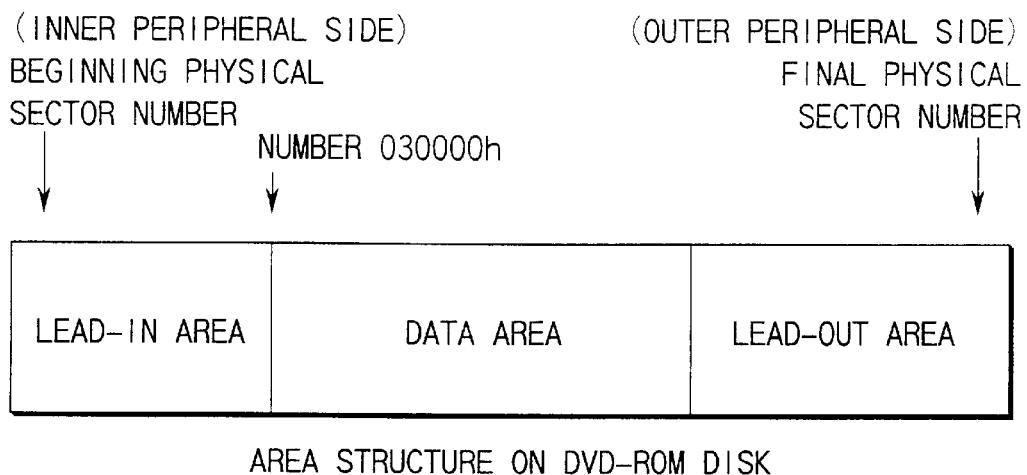
FIG. 24 is a diagram showing volume space when this information storage medium is a DVD-ROM disk.
FIG. 25 is a diagram for explaining the data format of a lead-in area of this DVD-ROM disk.

DVD-ROM will be described next. FIG. 24 shows the overall volume space of DVD-ROM. The lead-in area, the data area and the lead-out area are arranged from the inner periphery toward the outer periphery, and likewise physical sector numbers are affixed.

FIG. 25 shows the structure of data information to be described in the lead-in area. The physical sector number is predefined in accordance with the contents of each data.

As the number of use bytes is defined in the case of describing the physical format of DVD-ROM, FIG. 26 shows its contents.

As apparent from the above-described contents, a DVD-RAM disk and DVD-ROM disk have their own physical sector numbers.

In the information storage medium of this invention, it is necessary to generalize both and handle the information. For example, information of a part of the ROM section is copied into the RAM section. This requires a general address setting method which generalizes both.

There is a method of setting logical block numbers as the general addresses of a double-layer disk in a DVD-ROM disk. For the ROM disk, however, the logical sector number information which is the general addresses is recorded in the stage of production (forming of the information reproducing layer of ROM).

By way of contrast, the RAM area of the information storage medium of this invention is in a blank state and does not have information about the general addresses. Further, Jpn. Pat. Appln. KOKAI Publication No. 161404/1998 describes a logical sector number setting method for a partial ROM disk which has a ROM section and rewritable section in the same layer. But, as the ROM section in the same layer has address setting information in this information medium structure, it is easy to affix a logical sector number and processing takes place within quite the same layer, so that this method substantially differs from the one that handles a recording layer which has no information about the general addresses. Further, this publication uses FAT as a file system and needs the optimal logical sector number setting method for UDF (Universal Disk Format) that is used for DVD-RAM/ROM.

This invention therefore has a significant characteristic in that it has presented, for the first time, a method which sets general addresses (logical sector numbers) for an information storage medium having a recording layer that has no information about the general addresses and which is most suitable for UDF.

This invention has a specific feature in that, as a specific method of generally handing a DVD-RAM disk and a DVD-ROM disk, the general addresses are set by treating an information storage medium having multiple information layers shown in FIGS. 17A and 17B as a "1-volume information storage medium having large volume space".

The description of the following embodiment will explain the case where as the "general address setting method for a 1-volume information storage medium", a logical sector number setting method adapted to a single DVD-RAM disk that conforms to the UDF standards which are used for DVD-RAM disks is employed. But, the method is not restrictive, and as a general address setting method for a double-layer DVD-RAM/ROM disk and a disk pack containing a plurality of DVD-RAM disks in one pack, it can be set as "FAT 32 having a single volume" or "NTFS (New Technology File System) having a single volume" and "UNIX space having a single volume". Further, information storage media, such as MO and PD can be subjects as media having the above-described recording layer.

Before going into the general address setting method of this invention (logical sector number setting method), the directory structure on the volume space in this invention will be discussed.

Figure 27:
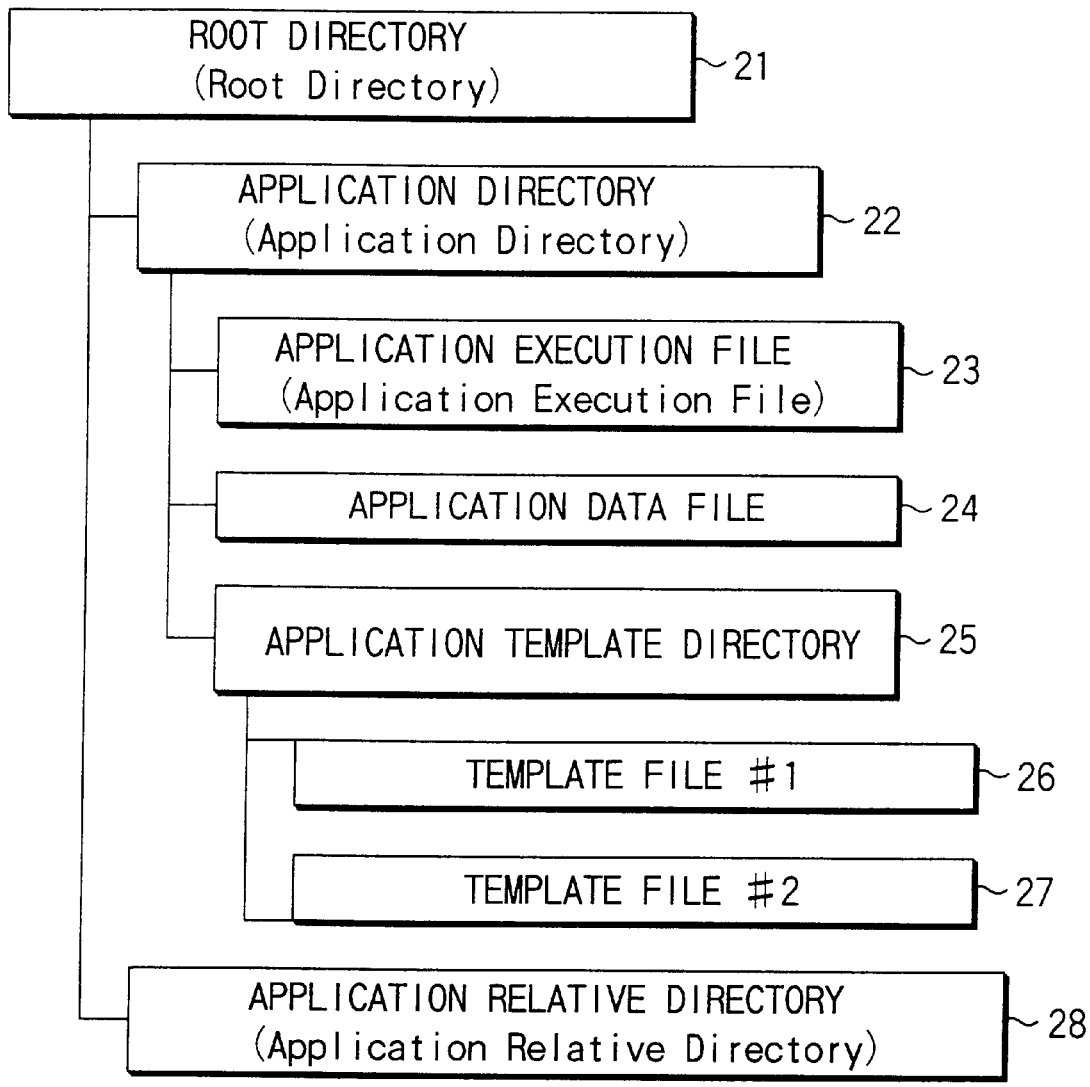
FIG. 27 is a diagram for explaining the directory structure of information recorded on this information storage medium.

As shown in FIG. 27, the directory structure for information recorded on the information storage medium of this invention has a root directory 21 as the overall parent, under which an application directory 22 and an application relative directory 28 exist.

The application directory 22 contains an application execution file 23 recording program software which automatically invoked when this information storage medium is loaded into the multi-purpose information processing apparatus of this invention shown in FIG. 1, an application data file 24 where data that is created when the program software is executed is to be recorded, and an application template directory 25 which is a sub directory. Further, the application template directory 25 includes template files #1, #2, 26, 27 and so forth.

The specific contents of those files would be as follows when, for example, Excel of Microsoft Corporation is recorded on the information storage medium and Excel on the information storage medium is invoked upon booting. That is, the application directory 22 corresponds to an MSoffice folder, the application execution file 23 corresponds to Excel.exe and the template files #1, #2, 26, 27 and so forth correspond to standard templates ***.xls. The data a user created using Excel corresponds to the application data file 24.

The application relative directory 28 corresponds to a sub directory (e.g., Winword) which contains an execution file of another application (e.g., MS-Word) which can use the application data file 24 created by the user as an object.

Figure 28:
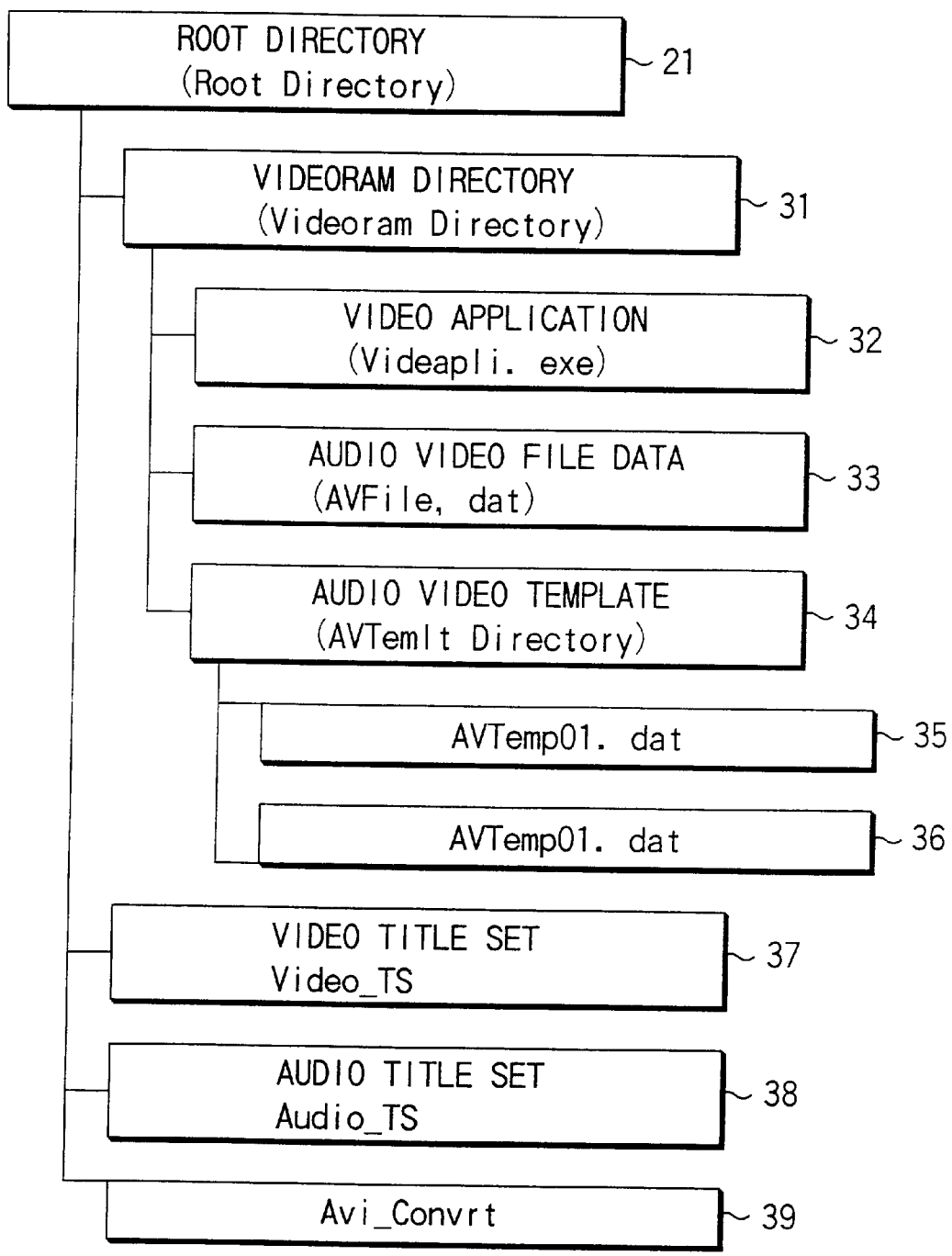
FIG. 28 is a diagram for explaining another directory structure of information recorded on this information storage medium.

When a video information processing program for recording, reproducing and editing video images is recorded on the information storage medium of this invention, particularly, the directory structure in FIG. 27 becomes as shown in FIG. 28.

That is, the video information processing program for recording, reproducing and editing video images is included in a video application (Videapli.exe) 32 in a videoram directory 31. The information that has-been recorded and edited here is saved as audio video file data (AVFile.dat) 33. Every recorded and edited information is recorded in this single AV video file data 33 in which video information (Video Object), audio information (Audio Object) and still picture information (Picture Object) as well as control information about them are recorded together. The standard templates to be used in editing video images are recorded in an audio video template (AVTemplt Directory) 34 as AVTemp01.dat 35 and AVTemp02.dat 36.

Commercial (CM) information is also included in AVTemp01.dat 35 and AVTemp02.dat 36. The AV video file data 33 after recording and completion of edition is converted to information of the DVD video format or DVD audio format in accordance with a conversion program in the video application 32, and is then saved under a video title set (Video_TS) 37 or an audio title set (Audio_TS) 38.

As another embodiment of this invention, general addresses (logical sector numbers) are affixed to a multiple disk pack containing plural information storage media accommodated as a set, so that it is treated as one volume. In this case, reproduction-only DVD video disks can be packed in this multiple disk pack.

A conversion table for the general addresses (general logical sector numbers) for the physical sector numbers of this reproduction-only DVD disk and the logical block number set in this DVD video disk is described in an address convert table in an allocation map table AMT (Allocation Map Table). Information in this DVD video disk is located under the video title set 37 or the audio title set 38 in FIG. 28 in terms of the general address (logical block number).

The DVD video disk information located under the video title set 37 or the audio title set 38 can be incorporated in the AV video file data 33 using the conversion program in the video application 32.

As a video file which is easily edited by a computer, for example, there is an Avi file which is used in Video for Windows or the like. Likewise, it is possible t convert partial video information (Video Object) in the AV video file data 33 to an Avi file using the conversion program in the video application 32, save it under the sub directory of an Avi_ Convrt 39, load the information storage medium which containing this Avi file into an ordinary PC system, edit it with an editing software (e.g., Media Studio Pro) in the PC system and then returns it into the AV video file data 33 again in the multi-purpose information processing apparatus of this invention.

Let us return to the description of the general address setting method for the information storage medium that has the structure as shown in FIGS. 17A and 17B having the recording layer 6 and the information reproducing layer 7.

This invention has a significant feature in that as the general address setting method, information of the recording layer 6 and the information reproducing layer 7 are generalized and are handled as parallel information in a single volume space.

That is, consecutive logical sector numbers LSN (Logical Sector Number) are assigned to the recording layer 6 and the information reproducing layer 7.

FIGS. 29 through 31 show one example in which a file system is created on the information storage medium according to the UDF. As apparent from FIGS. 29 to 31, the root directory and sub directory (Sub_Directory) information are often recorded mainly at addresses of smaller LSN (LBN: Logical Block Number) values. Therefore, the method of setting the LSN as the general address in this invention is designed as follows.

Figure 32:
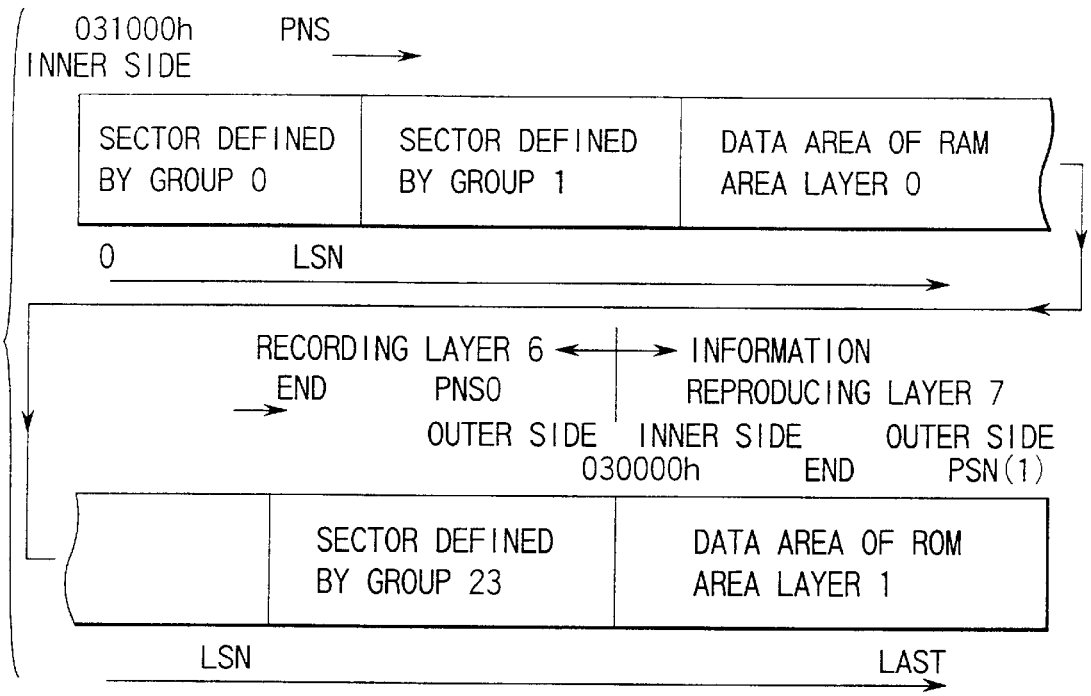
FIG. 32 is a diagram for explaining one example of volume space of this information storage medium.
Figure 33:
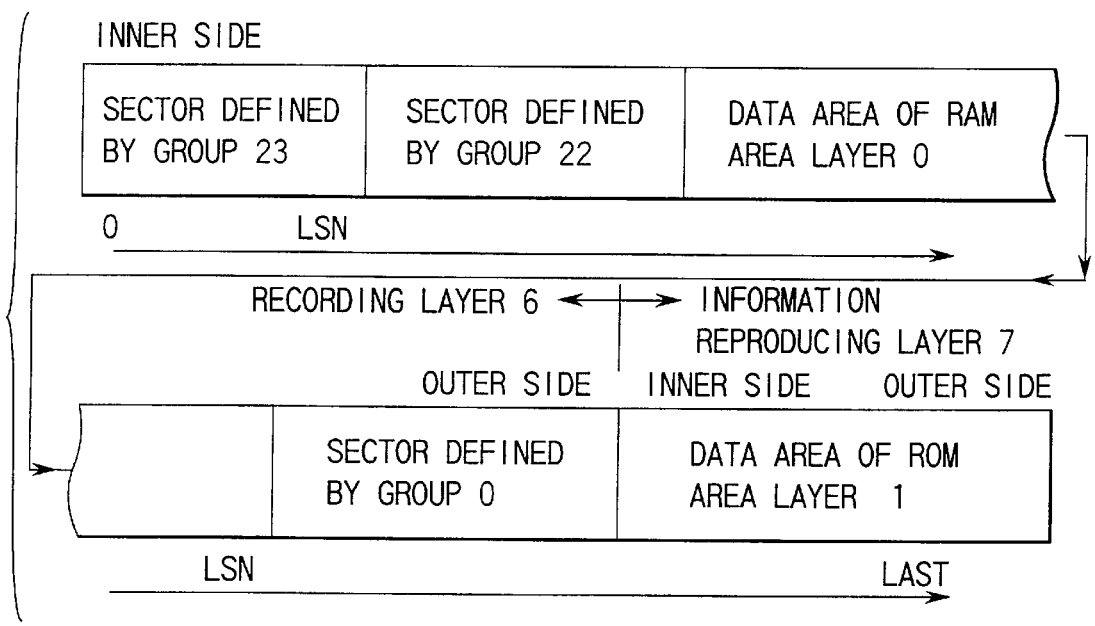
FIG. 33 is a diagram for explaining another example of volume space of this information storage medium.

As shown in FIGS. 32 and 33, the first half of the LSNs are assigned to the recording layer 6 (e.g., the DVD-RAM layer) and the second half of the LSNs are assigned to the information reproducing layer 7 (e.g., the DVD-ROM layer). By using the information storage medium format which can execute recording and reproduction by treating this one volume space as a pseudo recordable and reproducible area,

[1] information recorded on the information reproducing layer 7 is identified based on the features of recorded files. In the embodiment of this invention, the permissions in the file entry are set as write-inhibited to all users.

[2] considering that all information has already been recorded on the information reproducing layer 7, recorded flags are set at all the general address (LBN) positions corresponding to the information reproducing layer 7 as unrecorded area management information.

[3] at the time of initialization, part of information already recorded on the information reproducing layer is copied onto the recording layer to make it usable for the first time.

Through the above setting, information recorded in the recording layer 6 and information recorded in the information reproducing layer 7 are identified. Although the DVD-RAM standards are used in the description of the embodiment of this invention, they are not restrictive but a design modification with the above-described contents may be taken with the standards for MO, PD, CD-R or the like.

Figure 34A:
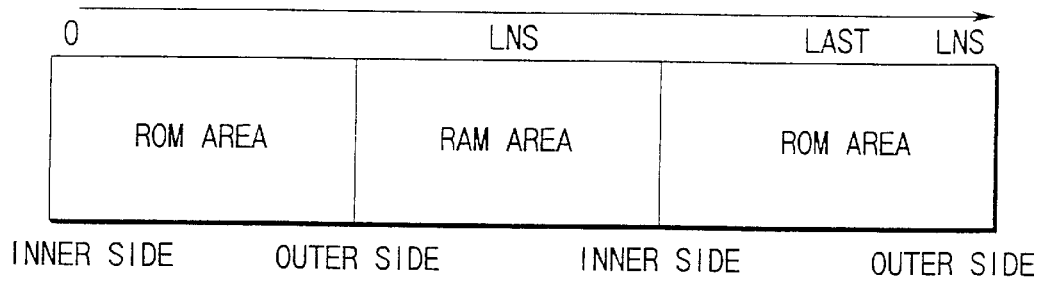
FIGS. 34A and 34B are diagrams for explaining a further example of volume space of this information storage medium.
Figure 34B:
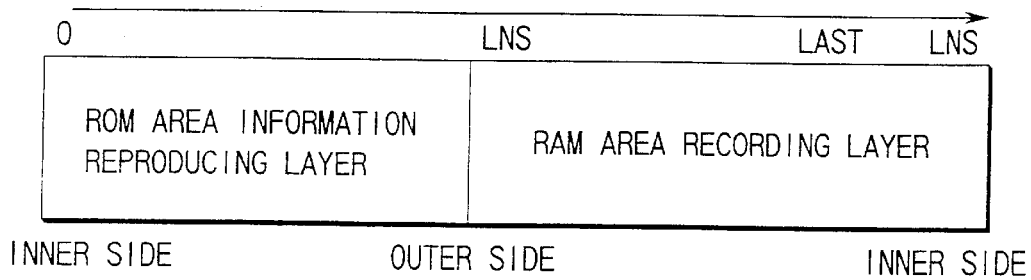

As shown in FIGS. 34A and 34B, various modifications are possible for the arrangement of the RAM area and the ROM area. In this case, if the disk shown in FIG. 34A has a three-layer structure having a RAM disk sandwiched between two ROM disks, the LSN is increased from the inner peripheral side of the ROM disks toward the outer peripheral side and the LSN is increased from the outer peripheral side of the ROM disks toward the inner peripheral side.

According to the logical sector number setting method for a double-layer DVD-ROM disk having two recording and reproducing layers stacked, information has originally been recorded on each layer, thus eliminating the need for the measures [1] to [3]. In the Jpn. Pat. Appln. KOKAI Publication No. 161404/1998, an operation of copying specific information from the ROM section to a rewritable section at the time of initializing a partial ROM disk, and then virtually setting part of the ROM section as a defect sector is performed.

According to this invention which makes good use of the feature of the UDF, by way of contrast, defect sector processing is not performed and a specific area (e.g., an area in which the volume management information of the DVD-ROM layer is described, or the like) is not designated as an access point in a file entry while keeping the areas in the entire recording layer and the entire information reproducing layer in a usable state.

A description will now be given of the format setting for DVD-RAM corresponding to the UDF. In DVD-RAM, with regard to the logical block (sector) size, a collection of logical blocks (sectors) of consecutive 2048 bytes is called "extent". One extent consists of a single logical block (sector) or a stream of consecutive logical blocks (sectors).

Figure 35:
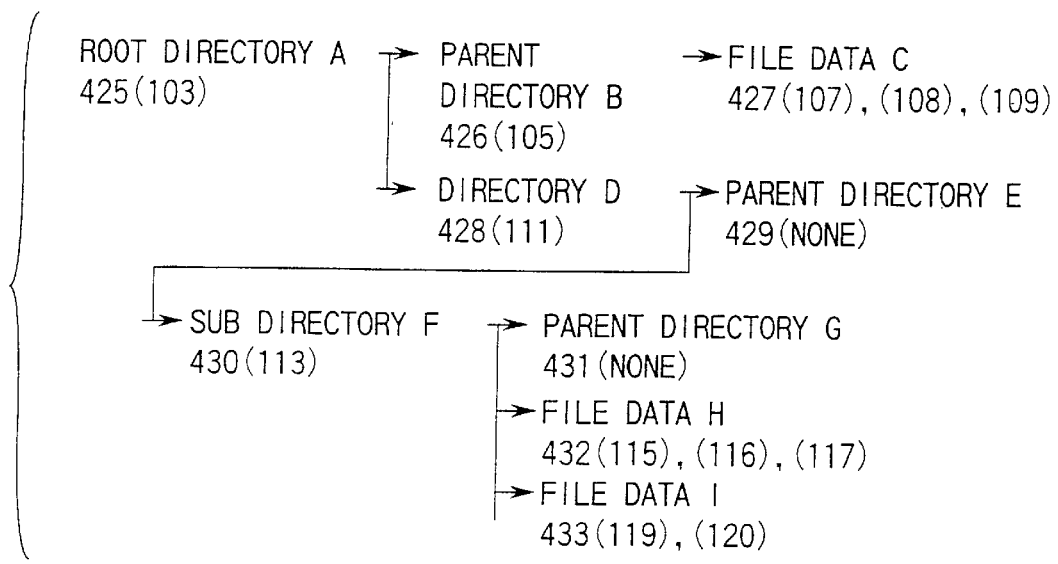
FIG. 35 is a diagram exemplifying a typical file system structure.

FIG. 35 exemplifies the file system structure, and within the parentheses is a logical block number of the position where an FID and file data are recorded on the information storage medium.

As mentioned earlier, FIGS. 29 through 31 show one example in which a file system is created on the information storage medium according to the UDF. And, LSN . . . logical sector number 491

LBN . . . logical block number 492

LLSN . . . last logical sector number (Last LSN) 493

It is extremely rare that a space bit map 453 is recorded together with a space table 452, and normally, either the space bit map 453 or the space table 452 is recorded.

The gist of the UDF will be explained below. As mentioned earlier, the UDF is the acronym of Universal Disk Format, and mainly indicates the "rules about the file management method" for a disk-shaped information storage medium.

CD-ROM, CD-R, CD-RW, DVD video, DVD-ROM, DVD-R, DVD-RAM and so forth use the UDF format standardized by ISO (International Organization for Standardization) 9660.

The file management method is basically premised on the hierarchical file system that has the root directory a parent and manages files in a tree form.

Although the following mainly discusses the UDF format that conforms to the DVD-RAM standards (File System Specifications), most of the contents of this description conform to the contents of the DVD-ROM standards.

In recording information on an information storage medium, a collection of information is called filed data, and recording is carried out file data by file data. To distinguish file data from another, a unique file name is added to each file data. Grouping plural pieces of file data which have common information contents facilitates file management and file retrieval. This group of plural pieces of file data is called a folder. A unique directory name (folder name) is given to each directory (folder). Further, a collection of a plurality of directories (folders) can be collected as an upper-rank group in an upper-rank directory (upper-rank folder). The file data and directories (folders) are generally called files here.

In recording information, all information concerning
(1) information contents of file data themselves,
(2) a file name corresponding to file data and
(3) the saving location of file data (under which directory it is to be recorded)
are recorded on the information storage medium.
Further, all information concerning
(4) a directory name (folder name) and
(5) the location where each directory (folder) belongs [the location of an upper-rank parent director (upper-rank folder)]
are also recorded on the information storage medium.

The entire recording area on the information storage medium is segmented into logical sectors having a minimum unit of 2048 bytes, with logical sector numbers sequentially affixed to all the logical sectors. In recording information on the information storage medium, information is recorded in the units of logical sectors. The recording position on the information storage medium is managed by the logical sector number of the logical sector where this information is recorded.

As shown in FIGS. 29 to 31, the logical sector where information about a file structure 486 and file data 487 is recorded is particularly called a logical block too, and a logical block number (LBN) is set in association with the logical sector number (LSN). The length of a logical block, like that of the logical sector, is 2048 bytes.

File management information is recorded in the aforementioned units of logical blocks. The contents that are recorded in each logical block are mainly as follows.

(1) A statement FID (File Identifier Descriptor) indicating information about a file. This describes the type of a file, a file name (root directory name, sub directory name and a file data name, etc.). Described in the FID are the data contents of file data following it, and a statement indicating the recording location of the contents of a directory, i.e., the recording location of a file entry corresponding to the associated file.

(2) A statement FE (File Entry) indicating the recording position of the contents of a file. This describes the position (logical block number) on the information storage medium where information about the data contents of file data and the contents of a directory (sub director or the like) are recorded.

The following will described the features of UDF in comparison with FAT which is used in HDD, FDD, MO and the like.

(1) The minimum unit (minimum logical block size, minimum logical sector size or the like) is large so that it is suitable for recording video information and music information which has a vast amount of information to be recorded. While the logical sector size of the FAT is 512 bytes, the logical sector (block) size of the UDF is larger and 2048 bytes (2) According to the FAT, an allocation management table for files to an information storage medium is locally recorded in a concentrated manner on the information storage medium, whereas according to the UDF, file management information can be recorded dispersedly at arbitrary positions on the disk. In the UDF, recording positions of file management information and file data on the disk are described as logical sector (block) numbers in an allocation descriptor.

Since the concentrated management in the file management area is performed in the FAT, the FAT is suitable for the usage that requires frequent change of the file structure (mainly for a frequent rewriting use) (because management information is easily rewritten due to the concentrated recording). Further, as the recording location of file management information is predetermined, a high reliability of the recording medium (fewer defect areas) is the premise.

As file management information is dispersed throughout the UDF, there are not many significant changes in file structure. The UIDF is suitable for usage (mainly a writing-once use) in which a new file structure is added later in a lower portion of the hierarchical system (mainly a portion lower than the root directory, because at the time of additional writing there are not many changes to the previous file management information). As the recording positions of the dispersed file management information can be designated arbitrarily, it is possible to avoid original defect portions in recoding. Further, as file management information can be recorded at an arbitrary position, the entire file management information can be recorded at one location, thus demonstrating the advantage of the FAT. The UDF can thus be considered as a higher general-purpose file system.

FIGS. 29 through 31 show the example in which the information of the file system structure in FIG. 35 is recorded on the information storage medium according to the UDF format.

As a method of managing unrecorded positions on an information storage medium, there are following two systems.

(1) Space Bit Map System

Using a space bit map descriptor 470, a "recorded" or "unrecorded" flag is set in a bit map form with respect to all the logical blocks of the recording area in the information storage medium.

(2) Space Table System

Using an unallocated space entry 471, all of unrecorded logical block numbers are described in the list in a short allocation descriptor.

Although both systems are shown in FIGS. 29 to 31 for the sake of explanation in the description of this embodiment, actually, both are hardly used together (recorded on the information storage medium) and only one of them is used.

The following are the brief description of the contents of main descriptors illustrated in FIGS. 29 to 31.

Beginning Extended Area Descriptor 445 . . . indicates the start position of VRS (Volume Recognition Sequence).

Volume Structure Descriptor 446 ... describes the explanation of the contents of the volume.

Boot Descriptor 447 ... describes process contents at the booting time.

Terminating Extended Area Descriptor 448 ... indicates the end of VRS.

Partition Descriptor 450 ... indicates partition information (size or the like). For DVD-RAM, one partition per volume is the fundamental rule.

Logical Volume Descriptor 454 ... describes the contents of logical volume.

Anchor Volume Descriptor Pointer 458 ... indicates the recording positions of a main volume descriptor sequence 449 and a reserve volume descriptor sequence 467 in the recording area of the information storage medium.

Reserved (all 00h byte)] 459–465 ... records a specific descriptor. To secure logical sector numbers, an adjustment area having all "0" recorded is provided therebetween.

Reserve Volume Descriptor Sequence 467 ... a backup area for information recorded in the main volume descriptor sequence 449.

A description will now be given of an accessing method on the information storage medium to reproduce data contents of, for example, file data H432 shown in FIG. 35, by using the file system information shown in FIGS. 29 to 31.

(1) An attempt is made to reproduce information in the boot descriptor 447 in the area of a volume recognition sequence 444 as a boot area at the time of the information recording/reproducing apparatus is activated or the information storage medium is loaded, the apparatus. A process at the time of booting is initiated along the described contents of the boot descriptor 447. When there is no particularly designated process at the time of booting, (2) Information in the logical volume descriptor 454 in the area of the main volume descriptor sequence 449 is reproduced first.

(3) A logical volume contents use 455 is described in the logical volume descriptor 454 and the logical block number that indicates the position where a file set descriptor 472 is recorded is described there in the form of a long allocation descriptor LAD (Long Allocation Descriptor). In the example shown in FIGS. 29 to 31, it is recorded in the 100th logical block from LAD (100).

(4) The 100th logical block (which is 372nd in terms of a logical sector number) is accessed to reproduce the file set descriptor 472. The location (logical block number) where a file entry associated with a root directory A425 is described in the LAD form in a root directory ICB473 in that descriptor. In the example in FIGS. 29 to 31, it is recorded in the 102nd logical block from LAD (102).

(5) According to the LAD (102) of the root directory ICB473, the 102nd logical block is accessed to reproduce a file entry 475 associated with the root directory A425 and read the position (logical block number) where information about the contents of the root directory A425 is recorded [AD (103)].

(6) The 103rd logical block is accessed to reproduce information about the contents of the root directory A425. As file data H432 is located under the series of a directory D428, an FID associated with the directory D428 is searched to read the logical block number where a file entry associated with the directory D428 is recorded [LAD (110) though not illustrated in FIGS. 29 to 31].

(7) The 110th logical block is accessed to reproduce a file entry 480 associated with the directory D428 to thereby read the position (logical block number) where information about the contents of the directory D428 is recorded [AD (111)].

(8) The 111st logical block is accessed to reproduce information about the contents of the directory D428. As the file data H432 is located directly under a sub directory F430, an FID associated with the sub directory F430 is searched to read the logical block number where a file entry associated with the sub directory F430 is recorded [LAD (112) though not illustrated in FIGS. 29 to 31].

(9) The 112nd logical block is accessed to reproduce a file entry 482 associated with the sub directory F430 to thereby read the position (logical block number) where information about the contents of the sub directory F430 is recorded [AD (113)].

(10) The 113rd logical block is accessed to reproduce information about the contents of the sub directory F430 and an FID associated with the file data H432 is searched. Then, from there, the logical block number where a file entry associated with the file data H432 is recorded is read out [LAD (114) though not illustrated in FIGS. 29 to 31].

(11) The 114th logical block is accessed to reproduce a file entry 484 associated with the file data H432 to thereby read the position where data contents 489 of the file data H432 are recorded.

(12) Information is reproduced from the information storage medium in the order of logical block numbers described in the file entry 484 associated with the file data H432 to thereby read the data contents 489 in the file data H432.

A description will now be given of a processing method including accessing in the case of changing the data contents of, for example, the file data H432 by using the file system information shown in FIGS. 29 to 31.

(1) A difference between volumes of data contents before and after the changing of the file data H432 should have been acquired, and that value should have been divided by 2048 bytes to compute how many additional logical blocks would be used or how many would become unnecessary in order to record changed data.

(2) An attempt is made to reproduce information in the boot descriptor 447 in the area of the volume recognition sequence 444 as a boot area at the time of the information recording/reproducing apparatus is activated or the information storage medium is loaded, the apparatus. A process at the time of booting is initiated along the described contents of the boot descriptor 447. When there is no particularly designated process at the time of booting, (3) The partition descriptor 450 in the main volume descriptor sequence 449 is reproduced first to read information of partition contents use 451 described there. The recording position of a space table or space bit map is indicated in this partition contents use 451 (also called Partition Header Descriptor). The space table position is described in the form of a short allocation descriptor in the column of the space table 452 which is not allocated [AD (50) in the example in FIGS. 29 to 31]. The space bit map position is described in the form of the short allocation descriptor in the column of the space bit map 453 which is not allocated [AD (0) in the example in FIGS. 29 to 31].

(4) An access is made to the logical block number (0) where the space bit map read in the above (3) is described. Space bit map information is read from the space bit map descriptor 470 to search for unrecorded logical blocks and the use of the logical blocks computed in (1) is registered (process of rewriting information of the space bit map descriptor 470). Or, (4') An access is made to the logical block number (50) where the space table read in the above (3) is described.

Unrecorded logical blocks are searched from USE (AD(*), AD(*), . . . , AD(*)) 471 of the space table, and the use of the logical blocks computed in (1) is registered (process of rewriting space table information).

Actually, either the process of (4) or (4') is carried out.

(5) Next, information in the logical volume descriptor 454 in the area of the main volume descriptor sequence 449 is reproduced first.

(6) The logical volume contents use 455 is described in the logical volume descriptor 454 and the logical block number that indicates the position where the file set descriptor 472 is recorded is described there in the LAD form. In the example in FIGS. 29 to 31, it is recorded in the 100th logical block from LAD (100).

(7) The 100th logical block (which is 400th in terms of a logical sector number) is accessed to reproduce the file set descriptor 472. The location (logical block number) where a file entry associated with the root directory A425 is described in the LAD form in the root directory ICB473 in that descriptor. In the example in FIGS. 29 to 31, it is recorded in the 102nd logical block from LAD (102).

(8) According to the LAD (102) of the root directory ICB473, the 102nd logical block is accessed to reproduce the file entry 475 associated with the root directory A425 and read the position (logical block number) where information about the contents of the root directory A425 is recorded [AD (103)].

(9) The 103rd logical block is accessed to reproduce information about the contents of the root directory A425. As the file data H432 is located under the series of the directory D428, an FID associated with the directory D428 is searched to read the logical block number where a file entry associated with the directory D428 is recorded [LAD (110) though not illustrated in FIGS. 29 to 31].

(10) The 110th logical block is accessed to reproduce the file entry 480 associated with the directory D428 to thereby read the position (logical block number) where information about the contents of the directory D428 is recorded [AD (111)].

(11) The 111st logical block is accessed to reproduce information about the contents of the directory D428. As the file data H432 is located directly under the sub directory F430, an FID associated with the sub directory F430 is searched to read the logical block number where a file entry associated with the sub directory F430 is recorded [LAD (112) though not illustrated in FIGS. 29 to 31].

(12) The 112nd logical block is accessed to reproduce the file entry 482 associated with the sub directory F430 to thereby read the position (logical block number) where information about the contents of the sub directory F430 is recorded [AD (113)].

(13) The 113rd logical block is accessed to reproduce information about the contents of the sub directory F430 and an FID associated with the file data H432 is searched. Then, from there, the logical block number where a file entry associated with the file data H432 is recorded is read out [LAD (114) though not illustrated in FIGS. 29 to 31].

(14) The 114th logical block is accessed to reproduce the file entry 484 associated with the file data H432 to thereby read the position where data contents 489 of the file data H432 are recorded.

(15) In consideration of the logical block numbers additionally registered in the above (4) or (4'), the data contents 489 in the changed file data H432 are recorded.

A description will now be given of a method of erasing specific file data and directory. As an example, a method of erasing the file data H432 or the sub directory F430 will be discussed.

(1) An attempt is made to reproduce information in the boot descriptor 447 in the area of the volume recognition sequence 444 as a boot area at the time of the information recording/reproducing apparatus is activated or the information storage medium is loaded, the apparatus. A process at the time of booting is initiated along the described contents of the boot descriptor 447. When there is no particularly designated process at the time of booting, (2) Information in the logical volume descriptor 454 in the area of the main volume descriptor sequence 449 is reproduced first.

(3) The logical volume contents use 455 is described in the logical volume descriptor 454 and the logical block number that indicates the position where the file set descriptor 472 is recorded is described there in the LAD form. In the example in FIGS. 29 to 31, it is recorded in the 100th logical block from LAD (100).

(4) The 100th logical block (which is 400th in terms of a logical sector number) is accessed to reproduce the file set descriptor 472. The location (logical block number) where a file entry associated with the root directory A425 is described in the LAD form in the root directory ICB473 in that descriptor. In the example in FIGS. 29 to 31, it is recorded in the 102nd logical block from LAD (102).

(5) According to the LAD (102) of the root directory ICB473, the 102nd logical block is accessed to reproduce the file entry 475 associated with the root directory A425 and read the position (logical block number) where information about the contents of the root directory A425 is recorded [AD (103)].

(6) The 103rd logical block is accessed to reproduce information about the contents of the root directory A425. As the file data H432 is located under the series of the directory D428, an FID associated with the directory D428 is searched to read the logical block number where a file entry associated with the directory D428 is recorded [LAD (110) though not illustrated in FIGS. 29 to 31].

(7) The 110th logical block is accessed to reproduce the file entry 480 associated with the directory D428 to thereby read the position (logical block number) where information about the contents of the directory D428 is recorded [AD (111)].

(8) The 111st logical block is accessed to reproduce information about the contents of the directory D428. As the file data H432 is located directly under the sub directory F430, an FID associated with the sub directory F430 is searched.

Here, to erase the sub directory F430, a "file erase flag" is set to the file characteristics in the FID associated with the sub directory F430. Further, the logical block number where a file entry associated with the sub directory F430 is recorded is read out [LAD (112) though not illustrated in FIGS. 29 to 31]. And, (9) The 112nd logical block is accessed to reproduce the file entry 482 associated with the sub directory F430 to thereby read the position (logical block number) where information about the contents of the sub directory F430 is recorded [AD (113)].

(10) The 113rd logical block is accessed to reproduce information about the contents of the sub directory F430 and an FID associated with the file data H432 is searched.

To erase the file data H432, the "file erase flag" is set to the file characteristics in the FID associated with the file data H432. Further, from there, the logical block number where a file entry associated with the file data H432 is recorded is read out [LAD (114) though not illustrated in FIGS. 29 to 31]. Then,

(11) The 114th logical block is accessed to reproduce the file entry 484 associated with the file data H432 to thereby read the position where data contents 489 of the file data H432 are recorded.

Thereafter, the logical block where the data contents 489 in the file data H432 have been recorded is set free (the logical block is registered in an unrecorded state) by the following method. That is,

(12) Then, the partition descriptor 450 in the main volume descriptor sequence 449 is reproduced first to read information of the partition contents use 451 described there. The recording position of a space table or space bit map is indicated in this partition contents use 451 (also called Partition Header Descriptor). The space table position is described in the form of a short allocation descriptor in the column of the space table 452 which is not allocated [AD (50) in the example in FIGS. 29 to 31]. The space bit map position is described in the form of the short allocation descriptor in the column of the space bit map 453 which is not allocated [AD (0) in the example in FIGS. 29 to 31].

(13) An access is made to the logical block number (0) where the space bit map read in the above (12) is described to rewrite the "logical block number to be freed" obtained as a result of (11) in the space bit map descriptor 470. Or, (13') An access is made to the logical block number (50) where the space table read in the above (12) is described to rewrite the "logical block number to be freed" obtained as a result of (11) in the space table.

Actually, either the process of (13) or (13') is carried out.
To erase file data I433,

(12) The position where data contents 490 in the file data I433 are recorded is read through the same procedures as the above (10) to (11).

(13) Then, the partition descriptor 450 in the main volume descriptor sequence 449 is reproduced first to read information of the partition contents use 451 described there. The recording position of a space table or space bit map is indicated in this partition contents use 451 (also called Partition Header Descriptor). The space table position is described in the form of a short allocation descriptor in the column of the space table 452 which is not allocated [AD (50) in the example in FIGS. 29 to 31]. The space bit map position is described in the form of the short allocation descriptor in the column of the space bit map 453 which is not allocated [AD (0) in the example in FIGS. 29 to 31].

(14) An access is made to the logical block number (0) where the space bit map read in the above (13) is described to rewrite the "logical block number to be freed" obtained as a result of (11) and (12) in the space bit map descriptor 470. Or, (14') An access is made to the logical block number (50) where the space table read in the above (13) is described to rewrite the "logical block number to be freed" obtained as a result of (11) and (12) in the space table.

Actually, either the process of (14) or (14') is carried out.

A description will now be given of a process of adding file data and a directory. As an example, an access and adding method at the time of adding new file data or directory under the sub directory F430 will be discussed.

(1) In the case of adding file data, the volume of the contents of the file data to be added should have been checked, and that value should have been divided by 2048 bytes to compute the number of logical blocks necessary to add file data.

(2) An attempt is made to reproduce information in the boot descriptor 447 in the area of the volume recognition sequence 444 as a boot area at the time of the information recording/reproducing apparatus is activated or the information storage medium is loaded, the apparatus. A process at the time of booting is initiated along the described contents of the boot descriptor 447. When there is no particularly designated process at the time of booting, (3) The partition descriptor 450 in the main volume descriptor sequence 449 is reproduced first to read information of the partition contents use 451 described there. The recording position of a space table or space bit map is indicated in this partition contents use 451 (also called Partition Header Descriptor).

The space table position is described in the form of the short allocation descriptor in the column of the space table 452 which is not allocated. AD (50) in the example in FIGS. 29 to 31. The space bit map position is described in the form of the short allocation descriptor in the column of the space bit map 453 which is not allocated. AD (0) in the example in FIGS. 29 to 31.

(4) An access is made to the logical block number (0) where the space bit map read in the above (3) is described. Space bit map information is read from the space bit map descriptor 470 to search for unrecorded logical blocks and the use of the logical blocks computed in (1) is registered (process of rewriting information of the space bit map descriptor 470). Or, (4') An access is made to the logical block number (50) where the space table read in the above (3) is described. Unrecorded logical blocks are searched from USE (AD(*), AD(*), ..., AD(*)) 471 of the space table, and the use of the logical blocks computed in (1) is registered.

Actually, either the process of (4) or (4') is carried out.

(5) Next, information in the logical volume descriptor 454 in the area of the main volume descriptor sequence 449 is reproduced first.

(6) The logical volume contents use 455 is described in the logical volume descriptor 454 and the logical block number that indicates the position where the file set descriptor 472 is recorded is described there in the LAD form. In the example in FIGS. 29 to 31, it is recorded in the 100th logical block from LAD (100).

(7) The 100th logical block (which is 400th in terms of a logical sector number) is accessed to reproduce the file set descriptor 472. The location (logical block number) where a file entry associated with the root directory A425 is described in the LAD form in the root directory ICB473 in that descriptor. In the example in FIGS. 29 to 31, it is recorded in the 102nd logical block from LAD (102).

(8) According to the LAD (102) of the root directory ICB473, the 102nd logical block is accessed to reproduce the file entry 475 associated with the root directory A425 and read the position (logical block number) where information about the contents of the root directory A425 is recorded [AD (103)].

(9) The 103rd logical block is accessed to reproduce information about the contents of the root directory A425. An FID associated with the directory D428 is searched to read the logical block number where a file entry associated with the directory D428 is recorded [LAD (110) though not illustrated in FIGS. 29 to 31].

(10) The 110th logical block is accessed to reproduce the file entry 480 associated with the directory D428 to thereby read the position (logical block number) where information about the contents of the directory D428 is recorded [AD (111)].

(11) The 111st logical block is accessed to reproduce information about the contents of the directory D428. An FID associated with the sub directory F430 is searched to read the logical block number where a file entry associated with the sub directory F430 is recorded [LAD (112) though not illustrated in FIGS. 29 to 31].

(12) The 112nd logical block is accessed to reproduce the file entry 482 associated with the sub directory F430 to thereby read the position (logical block number) where information about the contents of the sub directory F430 is recorded [AD (113)].

(13) The 113rd logical block is accessed to register the FID of file data or a directory to be newly added in information about the contents of the sub directory F430.

(14) An access is made to the position of the logical block number registered in the above (4) or (4') to record a file entry associated with the file data or directory to be newly added.

(15) An access is made to the position of the logical block number indicated in the short allocation descriptor in the file entry in the above (14) to record the FID of a parent directory associated with the directory to be added or the data contents of the file data to be added.

According to the file system standards that conform to the UDF of DVD-RAM, there are following rules.

The LSN of the start position of the volume recognition sequence 444 is set to "16".

Anchor points 456 and 457 are located at two of the following:
LSN=256
LSN=last LSN−256
LSN=last LSN FIGS. 36A, 36B, 37A and 37B illustrate an embodiment which satisfies the logical sector number setting method shown in FIGS. 32, 33, 34A and 34B while meeting the above rules.

Basically, nothing is recorded yet on a DVD-RAM layer immediately after placed on the market, except that it is described in the disk identifier zone recorded in the rewritable data zone in the lead-in area shown in FIG. 19 that the lamination structure of the recording layer 6 and the information reproducing layer 7 having structures as shown in FIGS. 17A and 17B, indicating the pre-initialization state. When initialization is conducted on the user side before use, the information recording/reproducing apparatus can automatically copy necessary information in the DVD-ROM layer to make it useable. At all the designated addresses for the information in the DVD-ROM layer to be copied, the addresses (LSN or LBN) in the DVD-RAM layer after copying are described. At the time of initialization, the volume recognition sequence 444, the first anchor point 456, the main volume descriptor sequence 449, a logical volume integrity sequence, the space bit map descriptor 470 or the unallocated space entry 471, the file set descriptor 472, the file entry 475 of the root directory, the LADs 476 in the root directory, and so forth are copied in the DVD-RAM layer to be usable.

As the second anchor point 457 and the reserve volume descriptor sequence 467 are located on the last LSN side on the DVD-ROM layer, they need not be copied into the DVD-RAM layer.

As another embodiment of this invention, the DVD-ROM layer may be arranged in the first half of LSNs and the DVD-RAM layer in the second half of LSNs as illustrated in FIGS. 34A and 34B earlier. The initializing method in this case becomes as shown in FIGS. 38A, 38B, 39A and 39B.

As apparent from the above, although the anchor points 456 and 457 and the main volume descriptor sequences 449 and 467 are copied from the DVD-ROM layer in FIGS. 36A, 36B, 37A, 37B, 38A, 38B, 39A and 39B, this is not restrictive and they may not be provided beforehand in the DVD-ROM layer and may be recorded in the DVD-RAM layer for the first time by the information recording/reproducing apparatus when the information recording/reproducing apparatus performs initialization. As another general address setting method, the LSNs of the DVD-RAM layer may be inserted between the LSNs of the DVD-ROM layer as shown in FIG. 34A, or reversely, the LSNs of the DVD-ROM layer may be inserted between the LSNs of the DVD-RAM layer though not illustrated.

The general address setting method of this invention is adapted to an information storage medium which has a plurality of layers including the recording layer.

Figure 40:
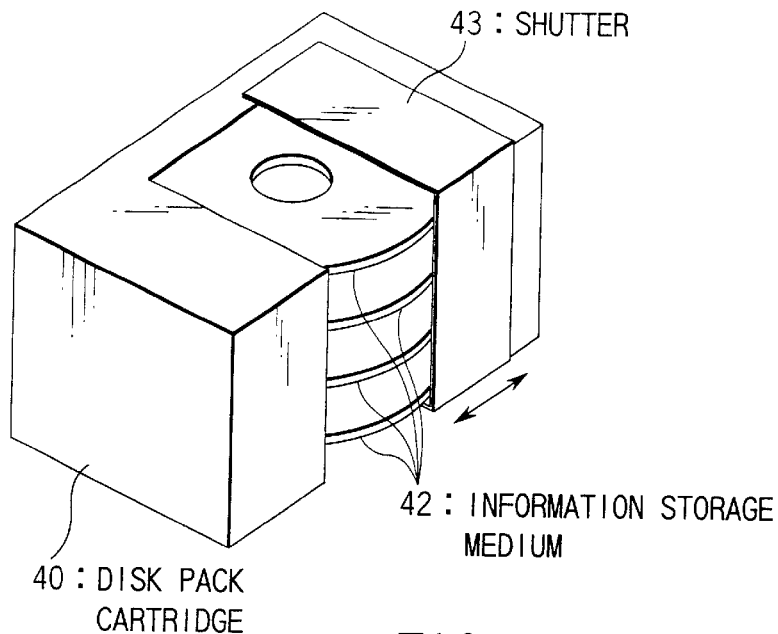
FIG. 40 is a perspective view showing the outward appearance of a multiple information storage medium.

As shown in FIG. 40, as another embodiment, this invention is adapted to a disk pack cartridge 40 where plural information storage media 42 are accommodated.

Nothing is rewritten on the information storage media 42 immediately after purchase. After purchase, on the user side, the information recording/reproducing apparatus automatically discriminates the quantity and the type (DVD-ROM or DVD-RAM) of the information storage media retained and records
1. unique ID of the multiple disk pack
2. the overall recording volume (including the information reproducing layer)
3. the recording volume of the recording layer
4. the total number of recording layers of the multiple disk pack
5. the recording layer number of each recording layer in the multiple disk pack in a reserve area in the control data zone in the lead-in area shown in FIG. 18 at the time of initialization. As the general address (LSN) setting method, this "recording layer number of each recording layer in the multiple disk pack" is used.

Figure 41:
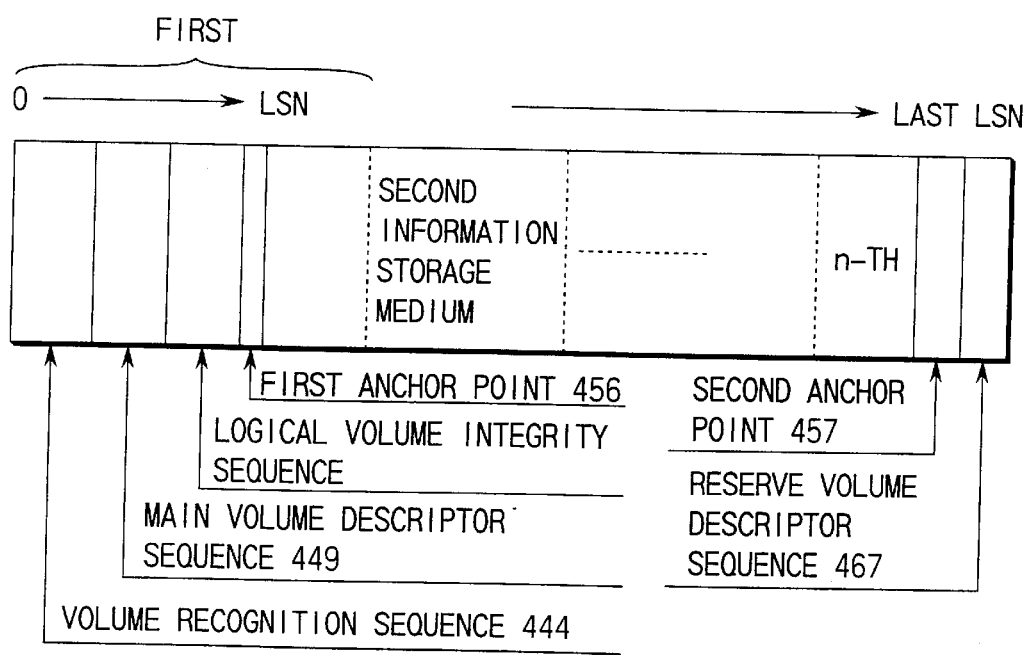
FIG. 41 is a diagram for explaining volume space when this invention is adapted to the information storage medium shown in FIG. 40.

That is, younger LSNs are set in order in those recording layers having smaller recording layer numbers as shown in FIG. 41. At the time of initialization, the information recording/reproducing apparatus also automatically records the volume recognition sequence 444, the first anchor point F456, the main volume descriptor sequence 449 and the logical volume integrity sequence in the first recording layer and records the second anchor point 457 and the reserve volume descriptor sequence 467 in the last (n-th one in FIG. 41) recording layer to make them usable.

As described above, in this invention, a multi-purpose information processing apparatus does not have an HDD or application software information or the like, uses an information storage medium having the stacked recording layer 6 and information reproducing layer 7 and invokes application software recorded on the information storage medium information and records formed information on the recording layer 6 of the information storage medium. Further, the multi-purpose information processing apparatus does not have a tray for loading the information storage medium. Therefore, the multi-purpose information processing apparatus becomes very thin and light. Furthermore, it can be used in multiple purposes by simply changing the information storage medium. As application software is provided on the information storage medium, the multi-purpose information processing apparatus can be made at a very low cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multi-purpose information processing apparatus comprising:

an information input section which inputs information;

an information processing section which performs predetermined information processing on the information input by the information input section;

an information display section which displays results of information processing in the information processing section; and a recording medium loading section which receives a removable information recording medium and reads information from the information recording medium, wherein:

the information input section, the information processing section, the information display section and the recording medium loading section are dispersedly arranged in at least three flat bodies;

the flat bodies are movably coupled together in such a way that the flat bodies can assume a stacked state and an expanded state;

information can be input and displayed when the flat bodies are expanded and the information input section and the information display section are exposed; and an information recording medium can be inserted/removed from the recording medium loading section when the flat bodies are stacked and the recording medium loading section is exposed on a major surface of at least one of the flat bodies.

2. The multi-purpose information processing apparatus according to claim 1, wherein the information recording medium is an optical disk.

3. The multi-purpose information processing apparatus according to claim 1, wherein the information display section is located to face inward and is not exposed when the flat bodies are stacked.

4. The multi-purpose information processing apparatus according to claim 1, wherein the information display section has a function of inputting information.

5. The multi-purpose information processing apparatus according to claim 1, wherein the information display section is formed so as to continuously extend over the flat bodies when the flat bodies are expanded.

6. The multi-purpose information processing apparatus according to claim 1, wherein the information input section is formed so as to continuously extend over the flat bodies when the flat bodies are expanded.

7. The multi-purpose information processing apparatus according to claim 1, wherein the flat bodies are in a stacked state, and the recording medium loading section is provided in a flat body located at one end of the stack of flat bodies.

8. The multi-purpose information processing apparatus according to claim 1, wherein the recording medium loading section and at least one section of the information input section are provided in one flat body.

9. The multi-purpose information processing apparatus according to claim 1, wherein the recording medium loading section and at least one section of the information display section are provided in one flat body.

10. The multi-purpose information processing apparatus according to claim 1, wherein the flat bodies are in a stacked state, and the recording medium loading section comprises an opening/closing member that can be opened/closed for inserting/removing the information recording medium.

11. The multi-purpose information processing apparatus according to claim 1, wherein the information recording medium is an optical disk; and the recording medium loading section comprises:

an opening/closing member provided for inserting/removing the optical disk when the flat bodies are stacked;

a turntable on which the optical disk is set; and a clamper provided for the opening/closing member which clamps the optical disk between the opening/closing member and the turntable.

12. The multi-purpose information processing apparatus according to claim 1, wherein a first flat body located at one end of a stack of flat bodies, and a second flat body located at another end of the stack of flat bodies are connected by a flexible substrate.

13. The multi-purpose information processing apparatus according to claim 12, wherein the information display section is formed so as to continuously extend over the first flat body, the flexible substrate, and the second flat body.

14. A multi-purpose information processing apparatus comprising:

an information input section which inputs information;

an information processing section which performs predetermined information processing on the information input by the information input section;

an information display section which displays results of information processing in the information processing section; and a recording medium loading section which receives a removable information recording medium and reads information from the information recording medium, wherein:

the information input section, the information processing section, the information display section and the recording medium loading section are dispersedly arranged in at least four flat bodies;

the flat bodies are movably coupled together in such a way that the flat bodies can assume a stacked state and an expanded state;

information can be input and displayed when the flat bodies are expanded and the information input section and the information display section are exposed; and an information recording medium can be attached/detached when the flat bodies are stacked and the recording medium loading section is exposed on a major surface of at least one of the flat bodies.

15. The multi-purpose information processing apparatus according to claim 14, wherein a first flat body and a second flat body are adjacent to one another when the flat bodies are expanded, the information display section is formed so as to continuously extend over the first flat body and the second flat body, a third flat body and a fourth flat body are adjacent to one another when the flat bodies are expanded, and the information input section is formed so as to continuously extend over the third flat body and the fourth flat body.

* * * * *